(12) United States Patent
Jinno

(10) Patent No.: US 10,712,215 B2
(45) Date of Patent: Jul. 14, 2020

(54) DETECTION DEVICE AND TORQUE SENSOR

(71) Applicant: DENSO CORPORATION, Kariya, Aichi-pref. (JP)

(72) Inventor: Satoru Jinno, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 81 days.

(21) Appl. No.: 16/064,162

(22) PCT Filed: Dec. 19, 2016

(86) PCT No.: PCT/JP2016/087720
§ 371 (c)(1),
(2) Date: Jun. 20, 2018

(87) PCT Pub. No.: WO2017/110715
PCT Pub. Date: Jun. 29, 2017

(65) Prior Publication Data
US 2018/0372567 A1    Dec. 27, 2018

(30) Foreign Application Priority Data

Dec. 24, 2015   (JP) .................................. 2015-251609
Aug. 3, 2016    (JP) .................................. 2016-152636

(51) Int. Cl.
*G01L 3/10* (2006.01)
*G01L 5/22* (2006.01)
(Continued)

(52) U.S. Cl.
CPC .............. *G01L 3/101* (2013.01); *G01L 5/221* (2013.01); *B62D 6/10* (2013.01); *B62D 15/0215* (2013.01)

(58) Field of Classification Search
CPC ........... G01L 3/101; G01L 5/221; B62D 6/10; B62D 15/0215
(Continued)

(56) References Cited

U.S. PATENT DOCUMENTS 7,355,390 B2 * 4/2008 Kogure .................... G01D 5/14
324/207.25
8,844,380 B2 * 9/2014 Takahashi ............... G01L 3/104
73/862
(Continued)

FOREIGN PATENT DOCUMENTS

EP           2957882 A1    12/2015
JP        2001-230023 A     8/2001
(Continued)

*Primary Examiner* — Octavia Hollington
(74) *Attorney, Agent, or Firm* — Maschoff Brennan

(57) ABSTRACT

A detection device includes a conductive member, a facing member, and a sensor portion. The conductive member is provided to be conductive to a grounded member having a ground potential. The sensor portion includes a sensor element, a sensor main body, and a grounded terminal. The sensor element is disposed in a sensor placement region which is located between the conductive member and the facing member and in which a distance between the conductive member and the facing member is shortest. The conductive member is provided to be conductive to the grounded terminal or a grounded wiring portion connected to the grounded terminal in a conductive region different from the sensor placement region. Accordingly, static electricity and noise escape to the grounded member without passing through the sensor main body. Therefore, damage to and malfunction of the sensor are restricted.

15 Claims, 26 Drawing Sheets

(51) Int. Cl.
*B62D 6/10* (2006.01)
*B62D 15/02* (2006.01)

(58) Field of Classification Search
USPC ..................................... 73/862.193
See application file for complete search history.

(56) References Cited

U.S. PATENT DOCUMENTS

| | | |
|---|---|---|
| 2002/0189371 A1 | 12/2002 | Nakane et al. |
| 2003/0209087 A1 | 11/2003 | Nakane et al. |
| 2005/0134258 A1 | 6/2005 | Kogure et al. |
| 2006/0114634 A1 | 6/2006 | Terada |
| 2006/0126239 A1 | 6/2006 | Terada |
| 2006/0137474 A1 | 6/2006 | Nakane et al. |
| 2006/0202679 A1 | 9/2006 | Kogure et al. |
| 2006/0291128 A1 | 12/2006 | Terada |
| 2008/0192401 A1 | 8/2008 | Terada |
| 2011/0221432 A1 | 9/2011 | Oota |
| 2011/0232988 A1* | 9/2011 | Aoki ............... G01L 25/003 180/446 |
| 2013/0319100 A1* | 12/2013 | Kichise ............ G01M 17/06 73/117.02 |
| 2014/0130612 A1 | 5/2014 | Takahashi et al. |
| 2014/0320119 A1* | 10/2014 | Tsuge ............... G01D 11/245 324/207.25 |
| 2015/0369679 A1 | 12/2015 | Ishimoto |

FOREIGN PATENT DOCUMENTS

| | | |
|---|---|---|
| JP | 2001-308586 A | 11/2001 |
| JP | 2003-149062 A | 5/2003 |
| JP | 2005-201898 A | 7/2005 |
| JP | 2005-302942 A | 10/2005 |
| JP | 2006-156846 A | 6/2006 |
| JP | 2006-174601 A | 6/2006 |
| JP | 2007-006242 A | 1/2007 |
| JP | 2007-013723 A | 1/2007 |
| JP | 2007-218789 | 8/2007 |
| JP | 2008-028214 A | 2/2008 |
| JP | 2008-216129 A | 9/2008 |
| JP | 2009-038095 A | 2/2009 |
| JP | 2011-253924 A | 12/2011 |
| JP | 2011-258916 A | 12/2011 |
| JP | 2013-235152 A | 11/2013 |
| JP | 2013-239697 A | 11/2013 |
| JP | 2014-115270 A | 6/2014 |
| JP | 2014-203290 A | 10/2014 |
| JP | 2016-003984 A | 1/2016 |

* cited by examiner

COMPARATIVE EXAMPLE

COMPARATIVE EXAMPLE

DETECTION DEVICE AND TORQUE SENSOR

CROSS REFERENCE TO RELATED APPLICATION

This application is based on Japanese Patent Applications No. 2015-251609 filed on Dec. 24, 2015 and No. 2016452636 filed on Aug. 3, 2016, the disclosures of which are incorporated herein by reference.

TECHNICAL FIELD

The present disclosure relates to a detection device and a torque sensor.

BACKGROUND ART

Conventionally, a torque sensor using a magnet and a magnetic sensor has been known. For example, in Patent Literature 1, a magnetic sensor is inserted into a gap between magnetic yokes facing each other in an axial direction to detect a magnetic flux density.

PRIOR ART LITERATURE

Patent Literature

Patent literature 1: JP 2003-149062 A

SUMMARY OF INVENTION

When a magnetic sensor is disposed in a path where electric resistance is lowest, passage of electrostatic energy through the magnetic sensor may damage the sensor or noise may cause malfunction of the sensor.

It is an object of the present disclosure to provide a detection device capable of restricting damage to or malfunction of a sensor and a torque sensor.

According to a first aspect of the present disclosure, a detection device includes a conductive member, a facing member, and a sensor portion. The conductive member is provided to be conductive to a grounded member having a ground potential. The facing member has at least one portion facing the conductive member. The sensor portion includes a sensor element, a sensor main body, and a grounded terminal.

The sensor element is disposed in a sensor placement region which is located between the conductive member and the facing member and in which a distance between the conductive member and the facing member is shortest. The sensor main body seals the sensor element. The grounded terminal protrudes from the sensor main body to be connected to the ground.

The conductive member is provided to be conductive to the grounded terminal or a grounded wiring portion connected to the grounded terminal in a conductive region different from the sensor placement region.

Accordingly, static electricity and noise escape to the grounded member without passing through the sensor main body. Therefore, damage to and malfunction of the sensor are restricted.

According to a second aspect of the present disclosure, a torque sensor includes the detection device in the first aspect of the present disclosure. The sensor element detects magnetic flux in accordance with a torque applied between a first shaft and a second shaft.

Accordingly, static electricity and noise escape to the grounded member without passing through the sensor main body. Therefore, damage to and malfunction of the sensor are restricted.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
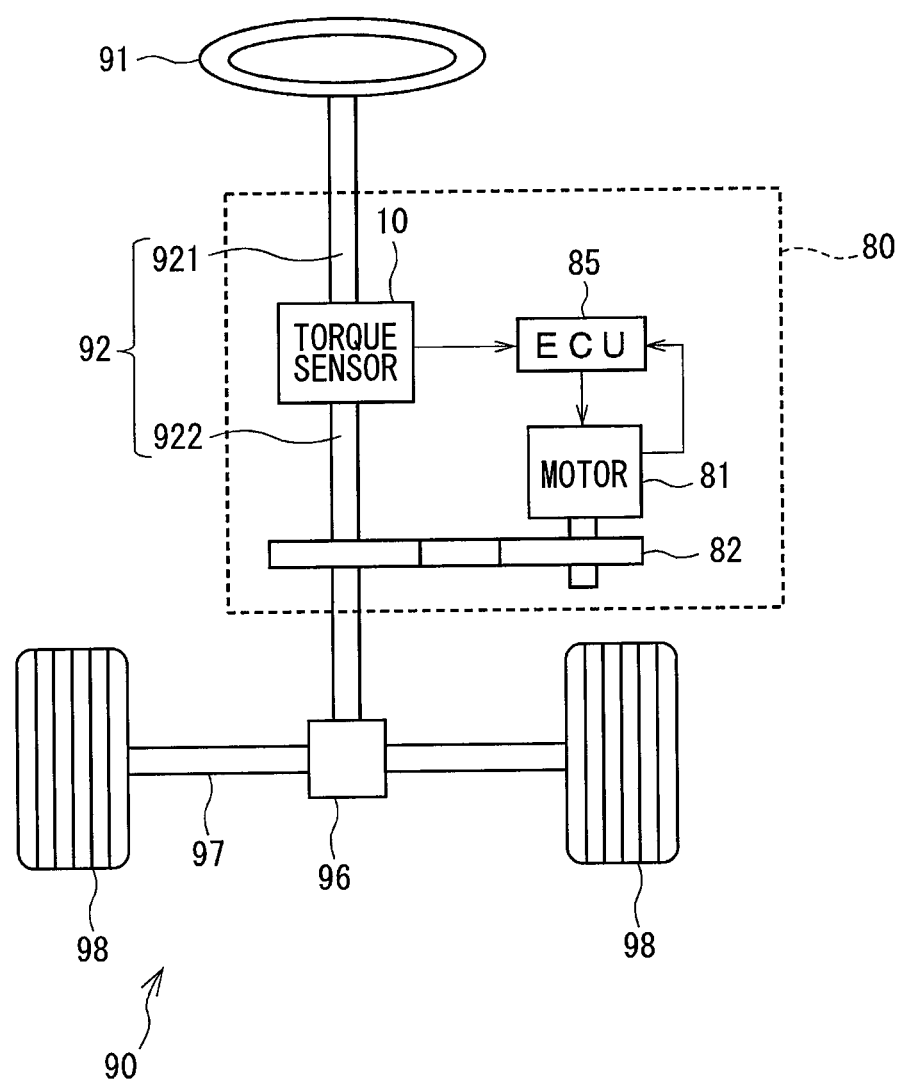
FIG. 1 is a diagram showing a schematic structure of an electric power steering system to which a torque sensor according to a first embodiment of the present disclosure is applied.

Hereinafter, a detection device and a torque sensor according to the present disclosure will be described with reference to the drawings. In a plurality of following embodiments, substantially the same components are given the same reference numerals, and a description of substantially the same components is omitted.

First Embodiment

FIGS. 1 to 8 show the first embodiment of the present disclosure. Each of the drawings in the present embodiment is a schematic view, and the scale and the like shown in the drawing are appropriately modified for the purpose of illustration. The same applies also to the drawings according to the embodiments described later.

Figure 2:
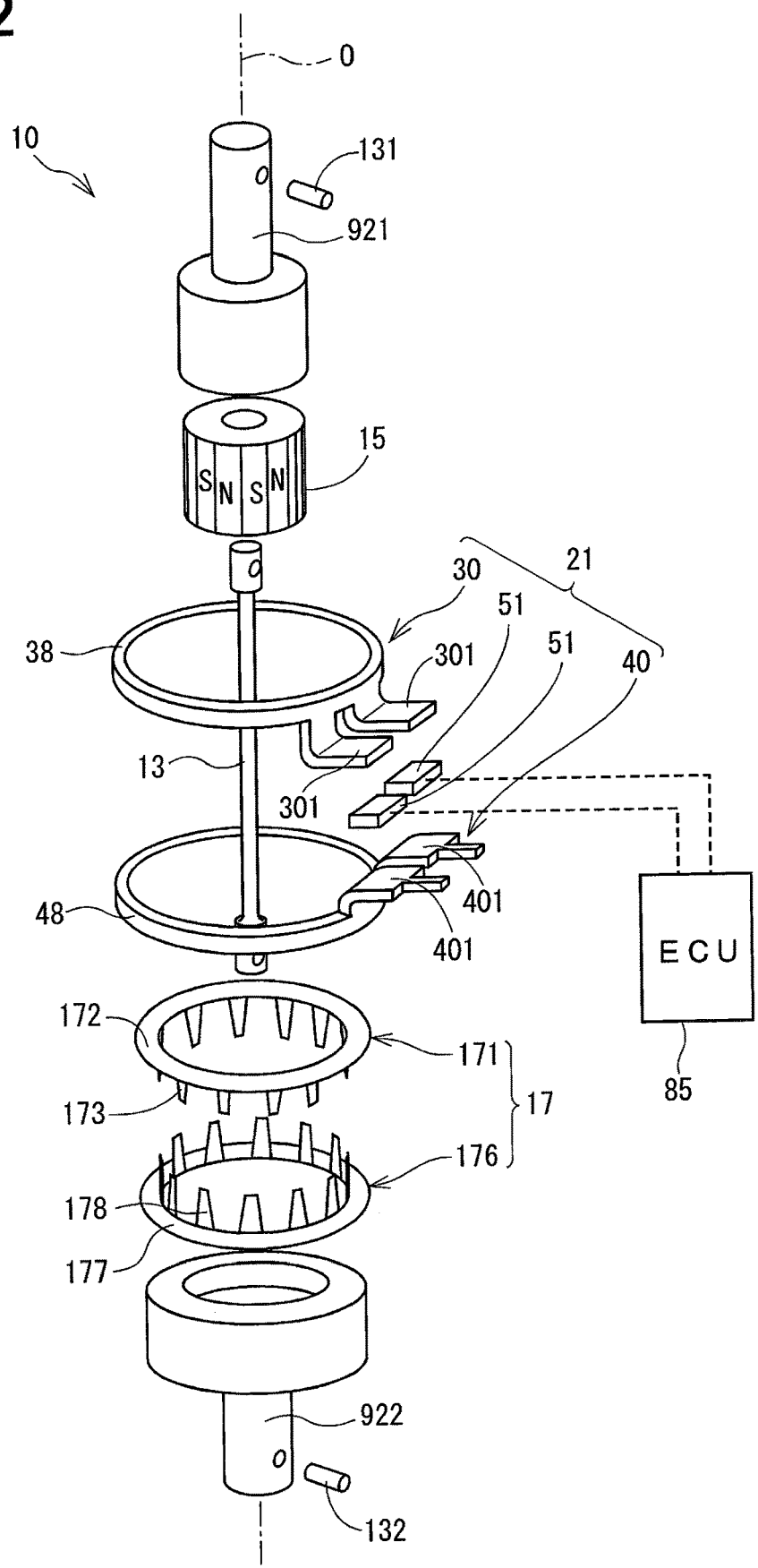
FIG. 2 is an exploded perspective view of the torque sensor according to the first embodiment of the present disclosure.

As shown in FIGS. 1 and 2, a torque sensor 10 using a detection device 21 in the present embodiment is applied to, e.g., an electric power steering device 80 for assisting a steering operation for a vehicle, FIG. 1 shows the overall configuration of a steering system 90 including the electric power steering device 80.

A steering wheel 91 as a steering member is connected to a steering shaft 92. The steering shaft 92 has an input shaft 921 as a first shaft and an output shaft 922 as a second shaft. The input shaft 921 is connected to the steering wheel 91. Between the end portion of the input shaft 921 opposite to the steering wheel 91 and the output shaft 922, the torque sensor 10 which detects the torque applied to the steering shaft 92 is provided. The input shaft 921 and the output shaft 922 are coaxially connected by a torsion bar 13 of the torque sensor 10. The end portion of the output shaft 922 opposite to the input shaft 921 is provided with a pinion gear 96. The pinion gear 96 meshes with a rack shaft 97. To the both ends of the rack shaft 97, a pair of wheels 98 is coupled via tie rods or the like.

When a driver rotates the steering wheel 91, the steering shaft 92 connected to the steering wheel 91 is rotated. The rotational movement of the steering shaft 92 is converted to the linear movement of the rack shaft 97 by the pinion gear 96 so that the wheels 98 are steered to angles corresponding to the amount of displacement of the rack shaft 97.

The electric power steering device 80 includes a motor 81 that outputs an assist torque which assists the steering of the steering wheel 91 by the driver, a control unit (hereinafter referred to as "ECU") 85, the torque sensor 10, and the like. In FIG. 1, the motor 81 and the ECU 85 are separate, but may also be integrated with each other.

A deceleration gear 82 as a power transmission portion decelerates the rotation of the motor 81 and transmits the decelerated rotation to the steering shaft 92. That is, the electric power steering device 80 in the present embodiment is a so-called "column assist type", but may also be a so-called "rack assist type" which transmits the rotation of the motor 81 to the rack shaft 97, The ECU 85 acquires the torque output from the torque sensor 10 and controls the driving of the motor 81 on the basis of the detected torque.

As shown in FIG. 2, the torque sensor 10 includes the torsion bar 13, a multi-pole magnet 15, a magnetic yoke 17, a detection unit 21, and the like and detects the torque applied to the steering shaft 92.

The torsion bar 13 has one end fixed to the input shaft 921 with a fixation pin 131 and the other end fixed to the output shaft 922 with a fixation pin 132. The torsion bar 13 is a rod-shaped elastic member and converts the torque applied to the steering shaft 92 to a torsional displacement.

The multi-pole magnet 15 is fixed to the input shaft 921 and has N-poles and S-poles which are alternately magnetized in a circumferential direction. In the present embodiment, the total number of the N-poles and the S-poles is 24, i.e., twelve pairs, but the number of pairs of the poles is not limited.

The magnetic yoke 17 has a first yoke 171 provided closer to the input shaft 921 and a second yoke 176 provided closer to the output shaft 922. Each of the first yoke 171 and the second yoke 176 is formed of a soft magnetic substance into an annular shape and fixed to the output shaft 922 radially outside the multi-pole magnet 15. The yokes 171 and 176 are held by a yoke holding member formed of a non-magnetic material and not shown.

The first yoke 171 has an annular portion 172 and claws 173 formed to protrude from the annular portion 172 toward the second yoke 176. The claws 173 are provided along the inner edge of the annular portion 172 to be equally spaced around the entire circumference of the annular portion 172.

The second yoke 176 has an annular portion 177 and claws 178 formed to protrude from the annular portion 177 toward the first yoke 171. The claws 178 are provided along the inner edge of the annular portion 177 to be equally spaced around the entire circumference of the annular portion 177.

Each of the number of the claws 173 and the number of the claws 178 is the same as the number of the pairs of the poles of the multi-pole magnet 15 (which is 12 in the present embodiment). The claws 173 and 178 are alternately arranged to be spaced apart from each other in the circumferential direction. The first yoke 171 and the second yoke 176 face each other in spaced-apart relation.

When there is no torsional displacement in the torsion bar 13, i.e., when no steering torque is applied to the steering shaft 92, the respective center positions of the claws 173 and 178 are located so as to coincide with the interfacial positions between the N-poles and the S-poles of the multi-pole magnet 15.

Figure 3:
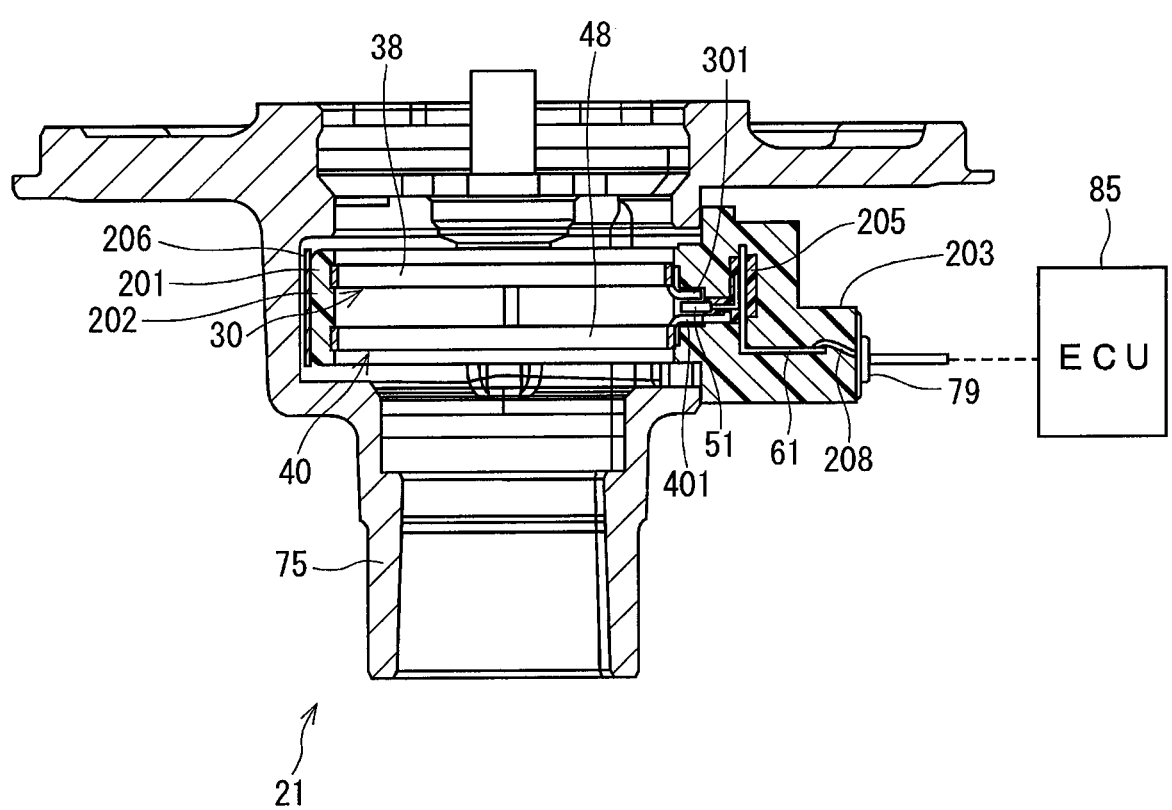
FIG. 3 is a cross-sectional view of the torque sensor according to the first embodiment of the present disclosure.

As shown in FIGS. 2 and 3, the detection device 21 includes a magnetism collection ring holding member 201, a terminal holding member 205, a shielding member 206, magnetism collection rings 30 and 40, sensor portions 51, a terminal substrate 61, noise protection elements 71 (see FIG. 4), and the like.

As shown in FIG. 3, the magnetism collection ring holding member 201 and the terminal holding member 205 are formed of a non-magnetic material such as a resin. The magnetism collection ring holding member 201 is integrally formed with an annular portion 202 which holds the magnetism collection rings 30 and 40 in an exposed state on a radially inner side and with a connector insertion portion 203 formed such that a connector 79 is insertable into the connector insertion portion 203.

The terminal holding member 205 holds each of the terminals of the sensor portions 51 and the terminal substrate 61 in the state where a sensor main body 511 of each of the sensor portions 51 is exposed. The terminal holding member 205 is held by the magnetism collection ring holding member 201 through insert molding or the like in the state where each of the terminals and the like are held and where the sensor portions 51 are located between respective magnetism collection portions 301 and 401 of the magnetism collection rings 30 and 40.

The shielding member 206 is provided so as to cover the radially outer side of the annular portion 202 of the magnetism collection ring holding member 201 and block magnetism from the outside.

The magnetism collection ring holding member 201 is fixed to a column 75, while holding the shielding member 206, the magnetism collection rings 30 and 40, the sensor portions 51, and the like. The column 75 is formed of a conductive metal, such as aluminum, and connected to a vehicle body ground. That is, the column 75 has a ground potential and corresponds to a "grounded member". In the present embodiment, the column 75 functions as a housing for the torque sensor 10.

In the present embodiment, between the magnetism collection rings 30 and 40 and the column 75, such a minute gap as to be able to transmit static electricity and noise is formed. In other words, the magnetism collection rings 30 and 40 are provided to be able to transmit static electricity and noise to the column 75.

As shown in FIGS. 2 and 3, each of the magnetism collection rings 30 and 40 is formed of a soft magnetic substance such as a nickel alloy. The magnetism collection rings 30 and 40 are disposed radially outside the magnetic yoke 17 to collect magnetic flux from the magnetic yoke 17. In the present embodiment, the upper magnetism collection ring 30 is disposed closer to the input shaft 921, while the lower magnetism collection ring 40 is disposed closer the output shaft 922. Hereinafter, as appropriate, a side where the input shaft 921 is located will be described as an "upper side" and a side where the output shaft 922 is located will be described as a "lower side". The axial direction and the radial direction of each of the multi-pole magnet 15, the magnetic yoke 17, and the magnetism collection rings 30 and 40 which are arranged around the torsion bar 13 will be referred to simply as an "axial direction" and a "radial direction".

The upper magnetism collection ring 30 includes an upper base portion 38 which is annularly formed and the two upper magnetism collection portions 301 each protruding radially and outwardly from the upper base portion 38.

The lower magnetism collection ring 40 includes a lower base portion 48 which is annularly formed and the two lower magnetism collection portions 401 each protruding radially and outwardly from the lower base portion 48.

The upper magnetism collection portions 301 and the lower magnetism collection portions 401 are disposed in spaced-apart relation to have respective facing surfaces generally parallel with each other.

Each of the two sensor portions 51 is a magnetic sensor disposed between the magnetism collection portions 301 and 401 to detect a change in magnetic flux between the magnetism collection portions 301 and 401.

Figure 4:
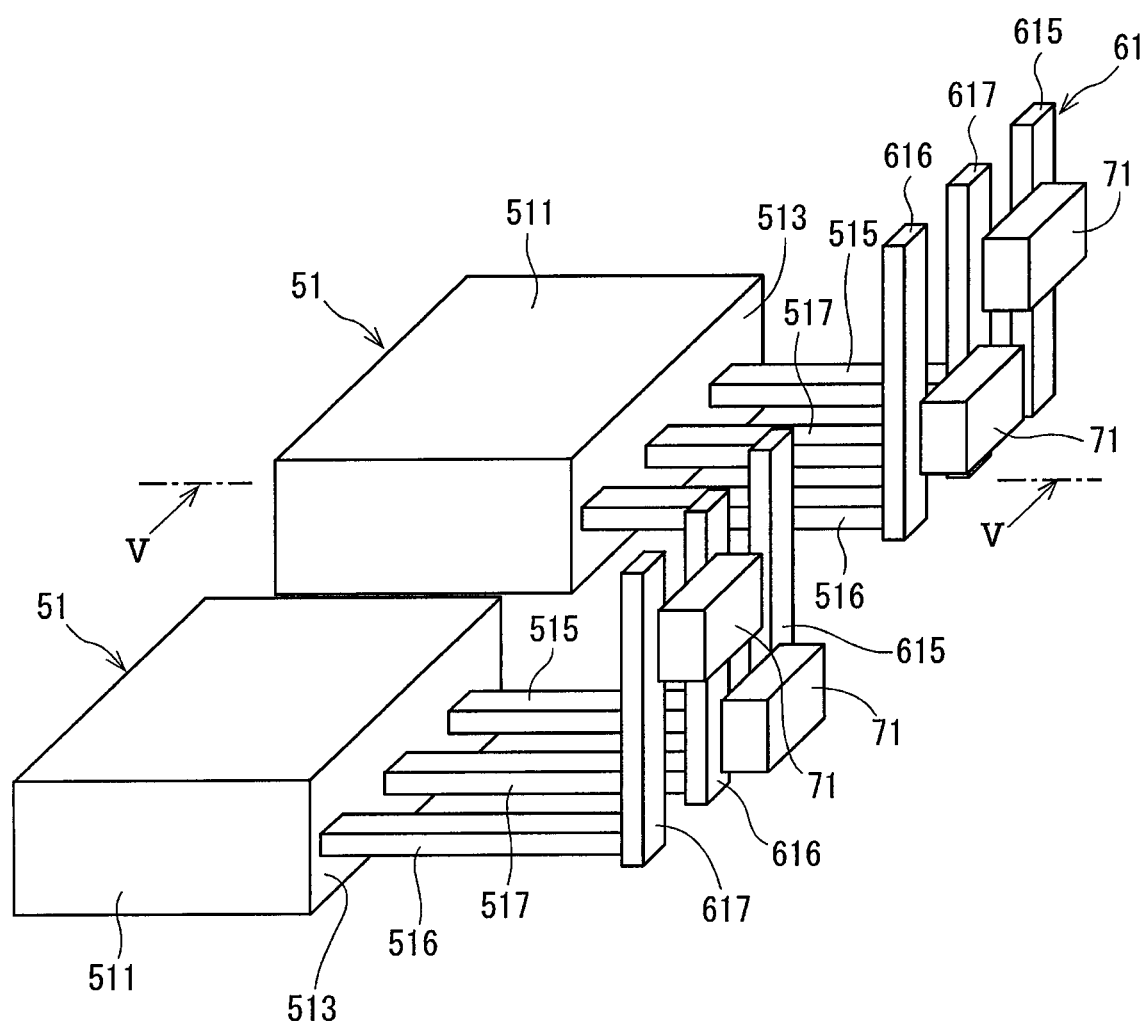
FIG. 4 is a perspective view of sensor portions according to the first embodiment of the present disclosure.
Figure 5:
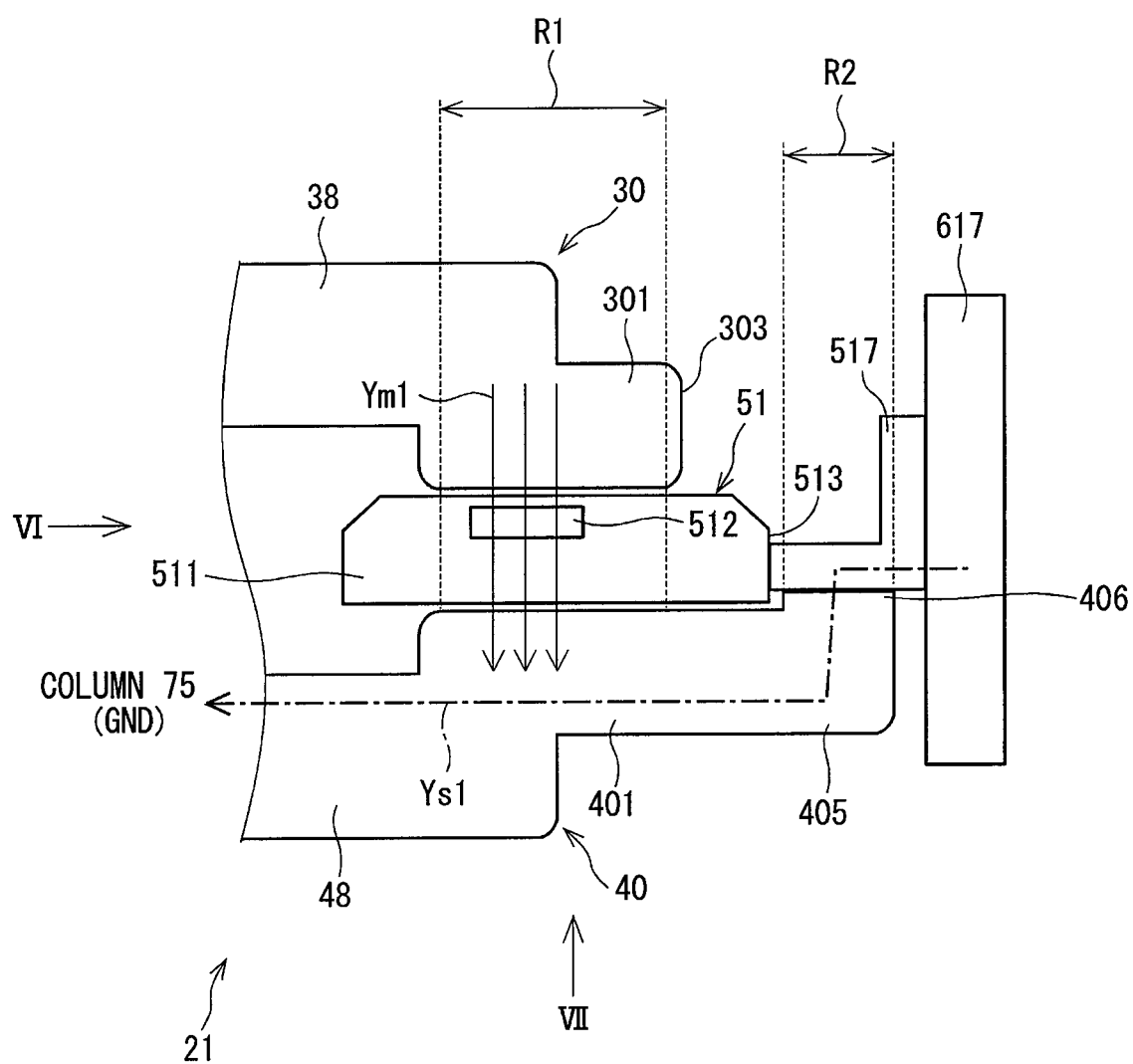
FIG. 5 is a cross-sectional view of each of the sensor portions and magnetism collection portions according to the first embodiment of the present disclosure.

As shown in FIGS. 4 and 5, each of the sensor portions 51 includes the sensor main body 511, an output terminal 515, a power supply terminal 516, and a grounded terminal 517. The output terminal 515, the power supply terminal 516, and the grounded terminal 517 are provided on a terminal formation surface 513 of the sensor main body 511. The terminal formation surface 513 is disposed to face radially outward, and the terminals 515 to 517 are provided to protrude radially outward. In the present embodiment, the output terminal 515, the grounded terminal 517, and the power supply terminal 516 are arranged in this order from one side. Note that the terminals 515 to 517 are spaced apart from each other by such distances as to be able to prevent dielectric breakdown even when static electricity is applied. The distance between the output terminal 515 and the grounded terminal 517 may be equal to or different from the distance between the power supply terminal 516 and the grounded terminal 517.

The terminals 515 to 517 are bent upward at portions where the terminals 515 to 517 may come in contact with the terminal substrate 61 and electrically connected to corresponding connection portions 615, 616, and 617 of the terminal substrate 61 by welding or the like.

The terminal substrate 61 is a metal substrate and used to connect the sensor portions 51 and the ECU 85. The terminal substrate 61 has the output terminal connection portion 615, the power supply terminal connection portion 616, and the grounded terminal connection portion 617. Each of the connection portions 615, 616, and 617 is connected to the connector 79 used for connection to the ECU 85 via a wire 208 (see FIG. 3). Thus, the sensor portions 51 and the ECU 85 are connected via the terminal substrate 61 and the like.

The output terminal 515 of each of the sensor portions 51 is connected to the output terminal connection portion 615 to be used to output a detection signal from the sensor portion 51. The detection signal is output to the ECU 85 via the output terminal connection portion 615.

The power supply terminal 516 is connected to the power supply terminal connection portion 616 to be connected to a power supply portion such as a regulator which is provided in the ECU 85 and not shown.

The grounded terminal 517 is connected to the grounded terminal connection portion 617 to be connected to the ground via the ECU 85.

Each of the noise protection elements 71 is connected to the output terminal connection portion 615 or the power supply terminal connection portion 616 and to the grounded terminal connection portion 617. The noise protection element 71 is a capacitor, a Zener diode, or the like.

FIG. 5 is a schematic cross-sectional view showing the magnetism collection portions 301 and 401 and each of the sensor portions 51 and corresponds to a cross-section along the line V-V in FIG. 4. In the illustration of FIG. 5, hatching is omitted. The same applies also to each of FIGS. 9, 11, 13, 25, and 26 according to embodiments described later.

As shown in FIG. 5, in the sensor main body 511, a sensor element 512 and the electronic components included in a detection circuit, such as a differential amplifier, are sealed. The sensor element 512 is a magnetism detection element such as a Hall element, which is disposed at a position where the distance between the magnetism collection portions 301 and 401 is shortest. This allows the sensor element 512 to appropriately detect a change in magnetic flux between the magnetism collection rings 30 and 40.

A description will be given herein of the influence of static electricity and noise. When static electricity or noise is applied to the device, the static electricity or noise is allowed to escape to the ground through a path where electric resistance is lowest. As the static electricity, a disturbance voltage which is relatively high and transiently applied is assumed herein and, as the noise, a disturbance voltage which is lower than that of the static electricity and continuously applied is assumed herein.

Figure 25:
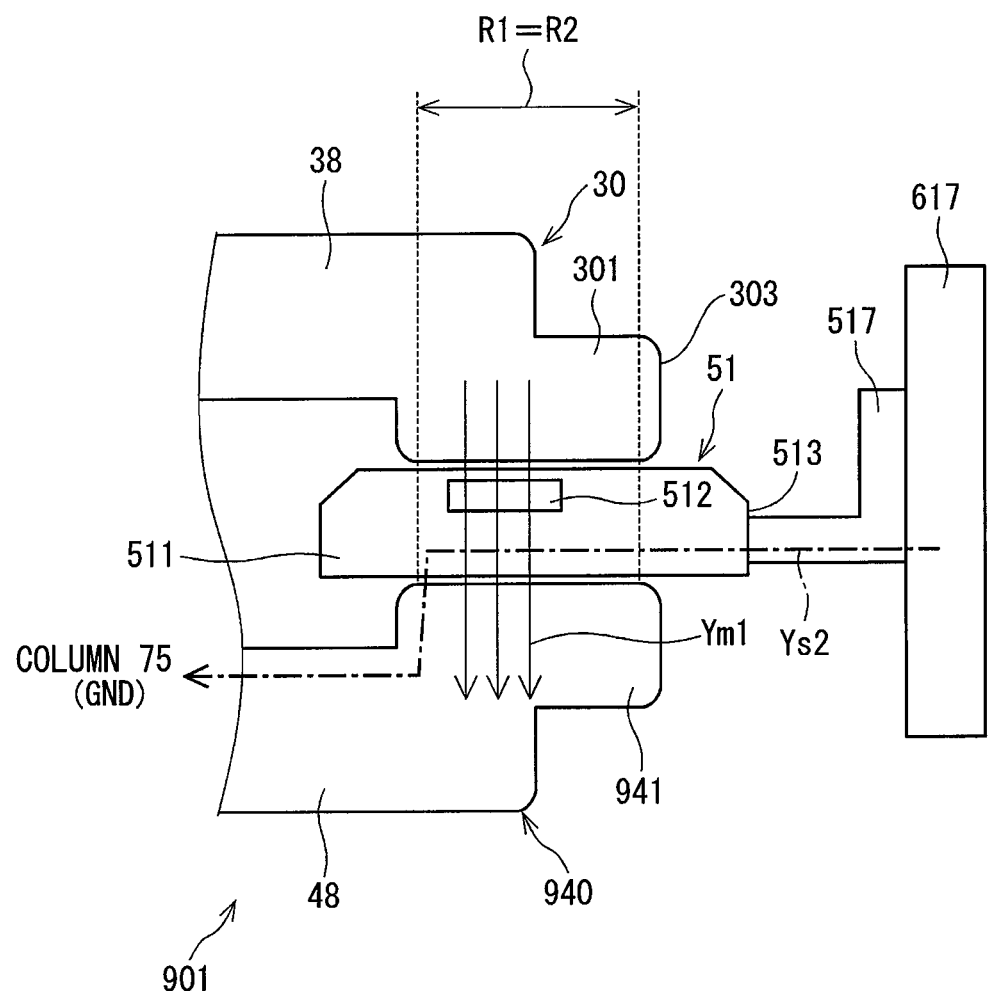
FIG. 25 is a cross-sectional view of each of the magnetism collection portions and the sensor portions according to a comparative example.

For example, in a detection device 901 in the comparative example shown in FIG. 25, each of magnetism collection portions 941 of a second magnetism collection ring 940 is formed in the same shape as that of each of the magnetism collection portions 301 of the upper magnetism collection ring 30. In this case, the sensor main body 511 is disposed on a path where electric resistance is lowest. As a result, when static electricity is applied, as shown by the arrow Ys2, electrostatic energy passes through the sensor main body 511 to possibly break the sensor portion 51. In addition, passage of noise through the sensor main body 511 may cause malfunction of the sensor portion 51 or erroneous detection by the sensor portion 51.

In this case, it is necessary to take measures against static electricity or noise for the sensor portion 51. Alternatively, it is necessary to provide an additional protection member for protecting the sensor portion 51 from static electricity or noise.

Figure 26:
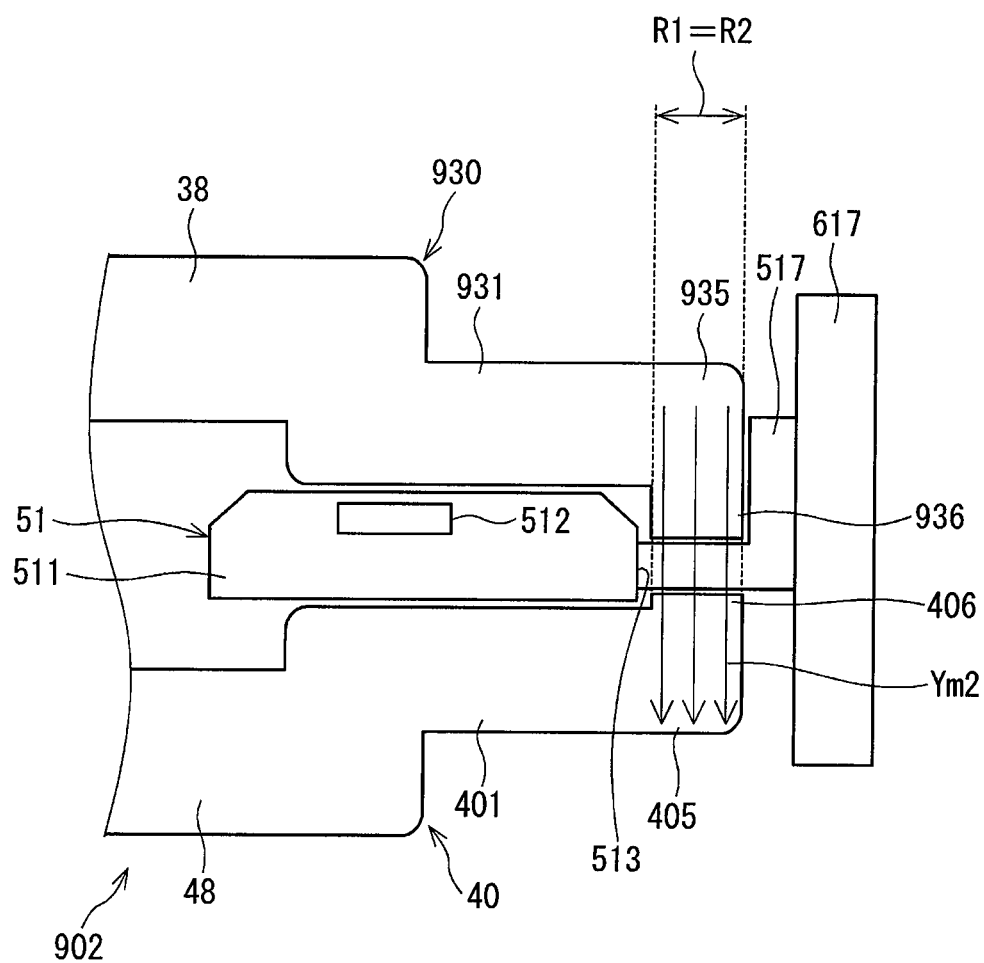
FIG. 26 is a cross-sectional view of each of the magnetism collection portions and the sensor portions according to a comparative example.

In a detection device 902 in the comparative example shown in FIG. 26, in each of magnetism collection portions 931 of a first magnetism collection ring 930, a protruding portion 935 and a bent portion 936 are formed in the same manner as in the lower magnetism collection ring 40. In this case, magnetic resistance is lowest in the area shown by the arrow Ym2 so that collected magnetic flux does not pass through the sensor element 512. As a result, the sensor element 512 cannot appropriately detect a change in magnetic flux between the magnetism collection rings 30 and 40.

Figure 6:
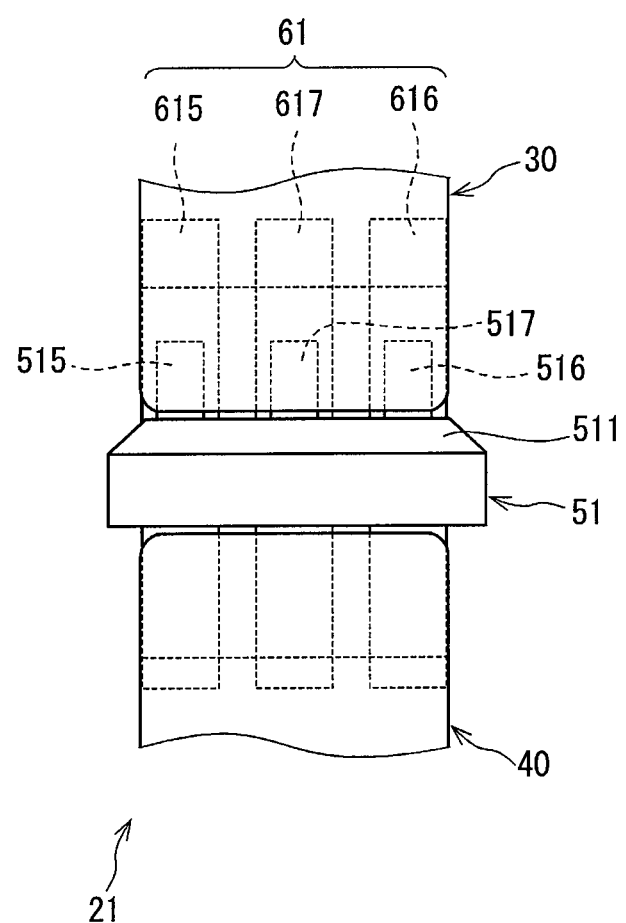
FIG. 6 is a view taken in the direction of the arrow VI in FIG. 5.
Figure 7:
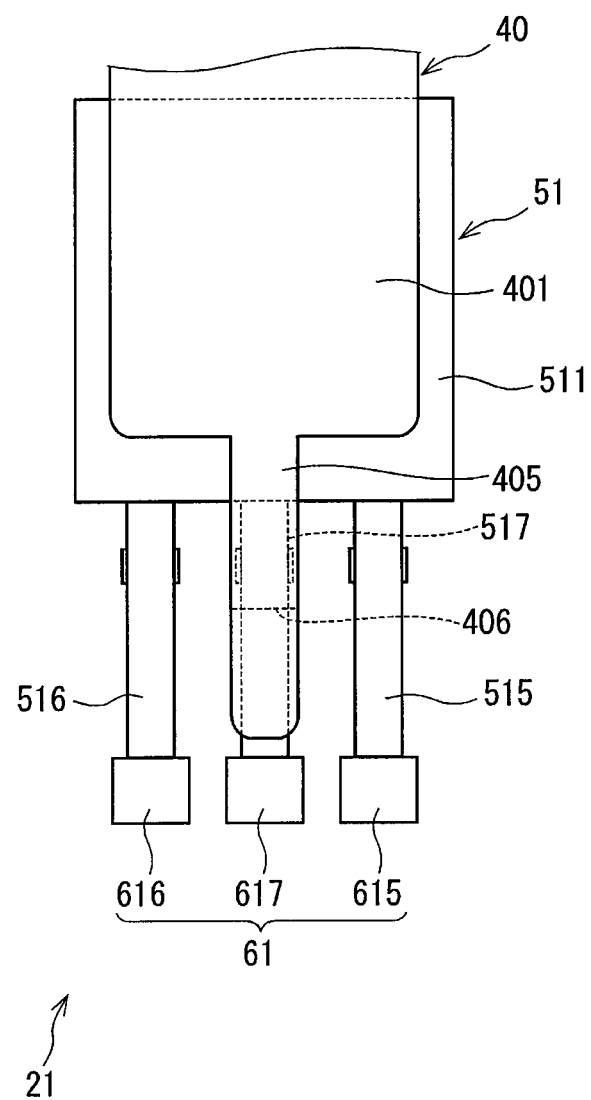
FIG. 7 is a view taken in the direction of the arrow VII in FIG. 5.

Accordingly, in the present embodiment, as shown in FIGS. 5, 6, and 7, the magnetism collection portions 301 and 401 are formed so as to allow the magnetic flux collected by the magnetism collection rings 30 and 40 to pass through the sensor element 512 and prevent the position where the sensor element 512 is disposed from being located on the path where electric resistance is lowest. In other words, a conductive region as an area where the grounded terminal 517 and the lower magnetism collection portion 401 are closest to each other and the sensor placement region as an area where the magnetism collection portions 301 and 401 are closest to each other are defined as different areas, and the sensor element 512 is disposed in the sensor placement region.

As a result, as shown by the arrow Ym1 in FIG. 5, the collected magnetic flux passes through the sensor element 512. Also, the sensor main body 511 is disposed in the area not included in the path along which static electricity and noise are allowed to escape and which is shown by the arrow Ys1.

In FIG. 5, the area where the magnetism collection portions 301 and 401 are closest to each other is shown by the symbol R1, while the area where the grounded terminal 517 and the lower magnetism collection portion 401 are closest to each other is shown by the symbol R2. That is, the area shown by the symbol R1 corresponds to the "sensor placement region where the distance between the conductive member and the facing member is shortest", while the area shown by the symbol R2 corresponds to the "conductive region". It is assumed that the same applies also to the drawings according to embodiments described later. Note that, in FIG. 25, R1=R2 is shown in consideration of the formation of the inner wiring of the grounded terminal 517 in the sensor main body 511.

When the grounded terminal 517 is in contact with the lower magnetism collection portion 401, the distance between the grounded terminal 517 and the lower magnetism collection portion 401 is 0. Accordingly, in the area where the grounded terminal 517 is in contact with the lower magnetism collection portion 401, the lower magnetism collection ring 40 and the grounded terminal 517 are closest to each other, and the distance between the lower magnetism collection ring 40 and the grounded terminal 517 is shortest.

Specifically, a tip portion 303 of the upper magnetism collection portion 301 is formed to be closer to the upper base portion 38 than the terminal formation surface 513 of the sensor main body 511.

On the other hand, in the area of the lower magnetism collection portion 401 which corresponds to the grounded terminal 517, an escape portion 405 protruding closer to the terminal substrate 61 than the terminal formation surface 513 is formed. More specifically, as shown in FIG. 7, the escape portion 405 is formed in the area having at least one portion overlapping the grounded terminal 517 when viewed from below. The escape portion 405 is bent toward the grounded terminal 517. A bent portion 406 formed by bending the escape portion 405 toward the grounded terminal 517 comes in contact with the grounded terminal 517. The bent portion 406 and the grounded terminal 517 may be in mere contact with each other or connected to be conductive to each other by solder bonding, welding, or the like. By bending the escape portion 405 and bringing the bent escape portion 405 into contact with the grounded terminal 517, the escape portion 405 can be formed relatively small irrespective of the distance to the terminal substrate 61.

In the present embodiment, the width of the escape portion 405 is larger than the width of the grounded terminal 517. However, the width of the escape portion 405 may also be smaller than the width of the grounded terminal 517 or larger than the width of the grounded terminal 517 to such an extent as to be able to ensure insulation between the output terminal 515 and the power supply terminal 516.

The same applies also to an escape portion 415 in the second embodiment.

In the present embodiment, the escape portion 405 and the terminal substrate 61 are spaced apart from each other.

Figure 8:
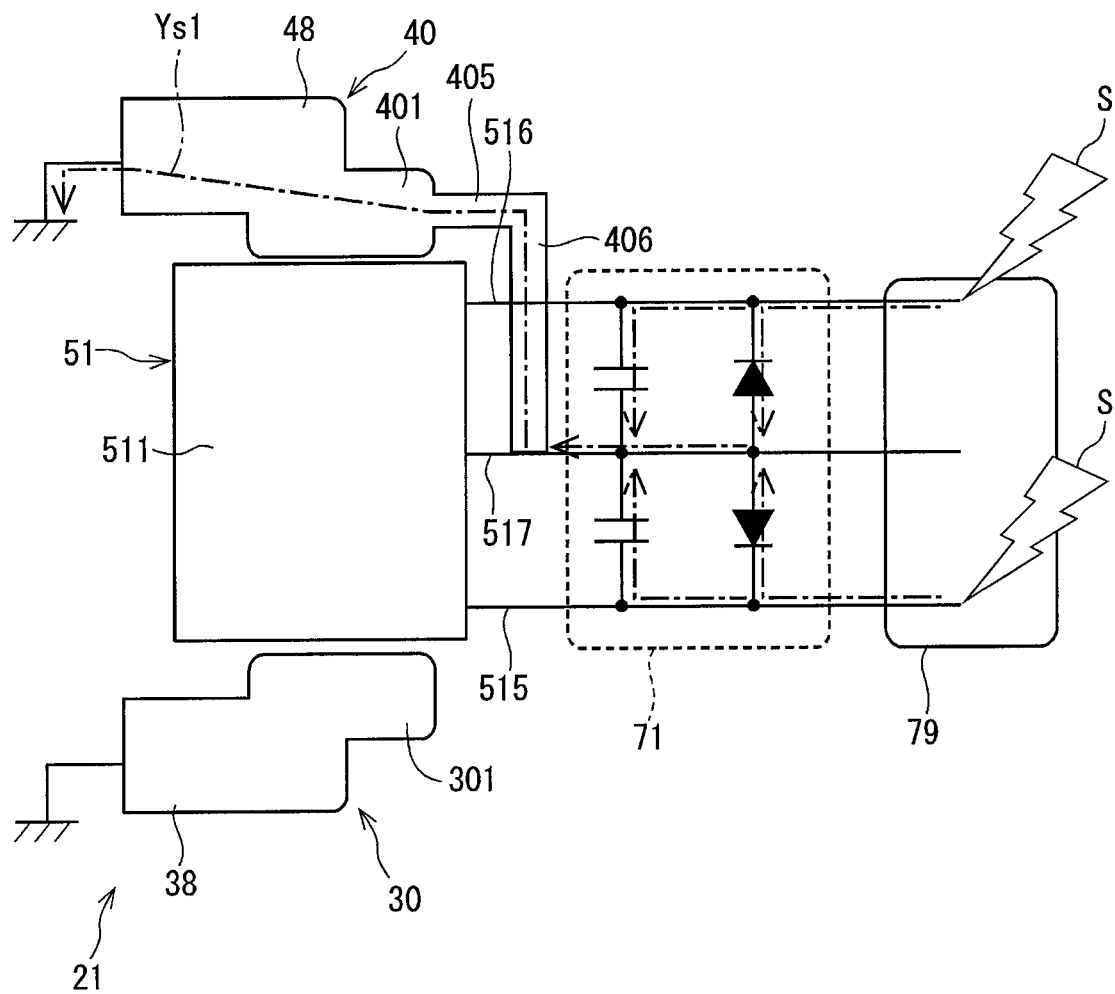
FIG. 8 is a schematic circuit diagram showing a conduction path for static electricity according to the first embodiment of the present disclosure.

The path along which electrostatic energy is transmitted will be described on the basis of FIG. 8. FIG. 8 is a schematic view obtained by combining the detection device 21 with a circuit diagram. In FIG. 8, static electricity is shown by the symbol S.

In the present embodiment, in the magnetism collection portion 401 of the lower magnetism collection ring 40, the escape portion 405 is formed in contact with the grounded terminal 517. Accordingly, electrostatic energy is transmitted from the grounded terminal 517 to the lower magnetism collection ring 40 without passing through the sensor main body 511 and allowed to escape to the column 75, while causing dielectric breakdown between the lower magnetism collection ring 40 and the column 75.

Also, in the present embodiment, the noise protection elements 71 are provided, and the output terminal 515 and the power supply terminal 516 are electrically connected to the grounded terminal 517 via the noise protection elements 71. As a result, when static electricity is applied to the output terminal 515 or the power supply terminal 516, electrostatic energy passes through the noise protection element 71 to reach the grounded terminal 517 and is allowed to escape to the column 75 in the same manner as when static electricity is applied to the grounded terminal 517.

Noise is also allowed to escape toward the column 75 along the same path.

This allows each of the sensor portions 51 to be protected from static electricity and noise, while reliably achieving the state where the sensor element 512 can detect magnetic flux.

As described above, the detection device 21 includes the lower magnetism collection ring 40, the upper magnetism collection ring 30, and the sensor portions 51.

The lower magnetism collection ring 40 is provided to be conductive to the column 75 at the ground potential.

The upper magnetism collection ring 30 has at least one portion disposed to face the lower magnetism collection ring 40.

Each of the sensor portions 51 has the sensor element 512, the sensor main body 511, and the grounded terminal 517. The sensor element 512 is disposed in the sensor placement region which is located between the lower magnetism collection ring 40 and the upper magnetism collection ring 30 and in which the distance between the lower magnetism collection ring 40 and the upper magnetism collection ring 30 is shortest. The sensor main body 511 seals the sensor element 512. The grounded terminal 517 protrudes from the sensor main body 511 to be connected to the ground.

The lower magnetism collection ring 40 is provided to be conductive to the grounded terminal 517 in the conductive region as the area different from the sensor placement region.

Thus, electrostatic energy and noise are allowed to escape toward the column 75 without passing through the sensor main body 511. This can restrict static electricity from damaging the sensor portion 51 or restrict noise from causing malfunction of the sensor. This can also omit an additional component provided to prevent static electricity or noise and omit a configuration for controlling static electricity or noise in the sensor portion 51, and thereby to allow the device to be simplified.

In addition, it is possible to appropriately detect an electromagnetic signal between the upper magnetism collection ring 30 and the lower magnetism collection ring 40 without allowing electrostatic energy or noise from passing through the sensor main body 511. In other words, it can be said that, in the present embodiment, a path having a resistance value smaller than that of a path passing through the sensor main body 511 is positively formed to thus restrict electrostatic energy from passing through the sensor main body 511 and protect the sensor main body 511. It can also be said that capacitive coupling different from that formed on a path extending through the sensor main body 511 is positively formed to thus restrict transmission of noise to the sensor main body 511, malfunction of the sensor portion 51, and erroneous detection by the sensor portion 51.

The lower magnetism collection ring 40 has the lower base portion 48 and the lower magnetism collection portion 401 formed to protrude from the lower base portion 48.

The upper magnetism collection ring 30 has the upper base portion 38 and the upper magnetism collection portions 301. The upper magnetism collection portions 301 protrude from the upper base portion 38 to face the lower magnetism collection portions 401.

The sensor placement region is the area where the lower magnetism collection portions 401 and the upper magnetism collection portions 301 face each other. The sensor element 512 detects magnetic flux between the lower magnetism collection portions 401 and the upper magnetism collection portions 301.

This allows the magnetic flux between the lower magnetism collection portions 401 and the upper magnetism collection portions 301 to be appropriately detected.

Each of the lower magnetism collection portions 401 has the escape portion 405 formed to protrude in a direction opposite to that toward the lower base portion 48. The escape portion 405 has the tip bent toward the grounded terminal 517 and is provided to be conductive to the grounded terminal 517. In the present embodiment, the escape portion 405 and the grounded terminal 517 come in conductive contact with each other.

This allows electrostatic energy and noise to appropriately escape toward the column 75 via the grounded terminal 517.

The torque sensor 10 includes the detection device 21. The sensor element 512 detects magnetic flux in accordance with the torque applied between the input shaft 921 and the output shaft 922.

This allows the torque sensor 10 to appropriately detect the torque between the input shaft 921 and the output shaft 922.

In the present embodiment, the lower magnetism collection ring 40 corresponds to a "conductive member", the lower base portion 48 corresponds to a "first base portion", the upper magnetism collection ring 30 corresponds to a "facing member", and the upper base portion 38 corresponds to a "second base portion". The same applies also to second to fifth embodiments. Also, the lower magnetism collection portion 401 corresponds to a "first magnetism collection portion", and the upper magnetism collection portion 301 corresponds to a "second magnetism collection portion".

The wording "provided to be conductive" used in the present description includes not only the case where the lower magnetism collection ring 40 and the grounded terminal 517 are in contact with each other and the case where the lower magnetism collection ring 40 and the grounded terminal 517 are electrically connected by solder bonding, welding, or the like, but also the case where such a minute gap as to be able to transmit static electricity or noise through dielectric breakdown, capacitive coupling, or the like is formed between the lower magnetism collection ring 40 and the grounded terminal 517. As long as static electricity or noise can be transmitted, another member such as, e.g., an insulating sheet or a resist pattern may also be disposed in the minute gap. The same applies also to the lower magnetism collection ring 40 and the column 75.

The same applies also to the embodiments described later. It is to be additionally noted that the lower magnetism collection ring may also be replaced with the upper magnetism collection ring. It is also to be noted that the grounded terminal may be replaced with the grounded terminal connection portion 617, the grounded pattern, or the like.

Second Embodiment

Figure 9:
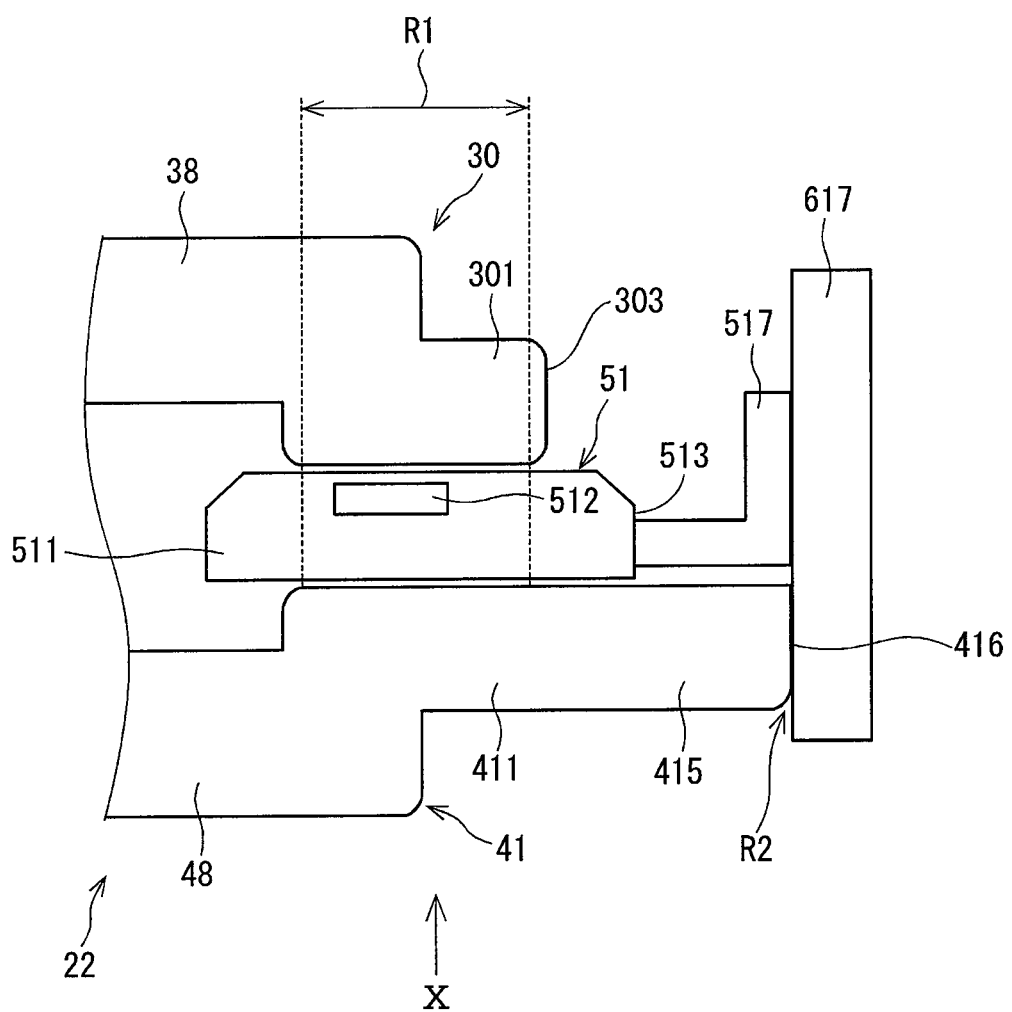
FIG. 9 is a cross-sectional view of each of the sensor portions and the magnetism collection portions according to a second embodiment of the present disclosure.
Figure 10:
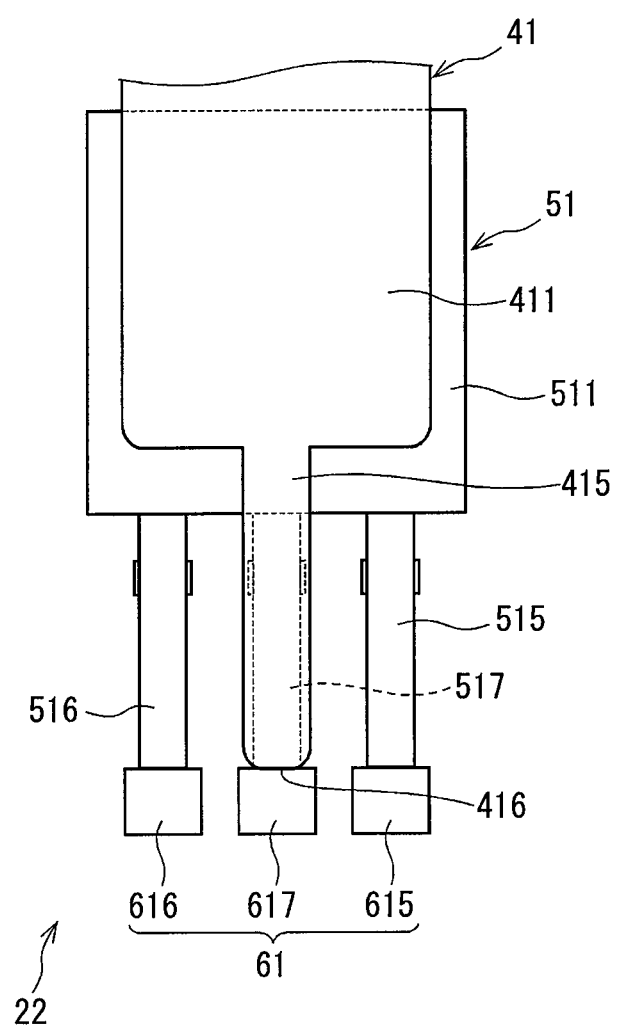
FIG. 10 is a view taken in the direction of the arrow X in FIG. 9.

FIGS. 9 and 10 show the second embodiment of the present disclosure.

In a lower magnetism collection ring 41 of a detection device 22 of the present embodiment, two lower magnetism collection portions 411 are formed. The magnetism collection ring 41 is the same as the lower magnetism collection ring 40 in the foregoing embodiment except that each of the magnetism collection portions 411 has a shape different from that of each of the lower magnetism collection portions of the lower magnetism collection ring 40.

An escape portion 415 of each of the lower magnetism collection portions 411 is formed in the area corresponding to the grounded terminal 517 to extend toward the terminal substrate 61, and a tip portion 416 comes in contact with the grounded terminal connection portion 617. In the present embodiment, the area where the escape portion 415 and the grounded terminal connection portion 617 are in contact with each other corresponds to the "conductive region".

The escape portion 415 and the grounded terminal 517 are spaced apart from each other.

In the present embodiment, the escape portion 415 is formed to extend in a direction opposite to that toward the first base portion 48 and provided to be conductive to the grounded terminal connection portion 617. In the present embodiment, the escape portion 415 and the grounded terminal connection portion 617 come in conductive contact with each other.

In such a configuration also, it is possible to allow static electricity or noise to appropriately escape toward the column 75 via the grounded terminal connection portion 617 and the lower magnetism collection ring 41 without passing through the sensor main body 511. In addition, since the escape portion 415 need not be bent, processing is easier.

Additionally, the same effects as achieved by the foregoing embodiment are achieved.

In the present embodiment, the lower magnetism collection ring 41 corresponds to the "conductive member", and the lower magnetism collection portion 411 corresponds to the "first magnetism collection portion". Also, the grounded terminal connection portion 617 corresponds to a "grounded wiring portion".

Third Embodiment

Figure 11:
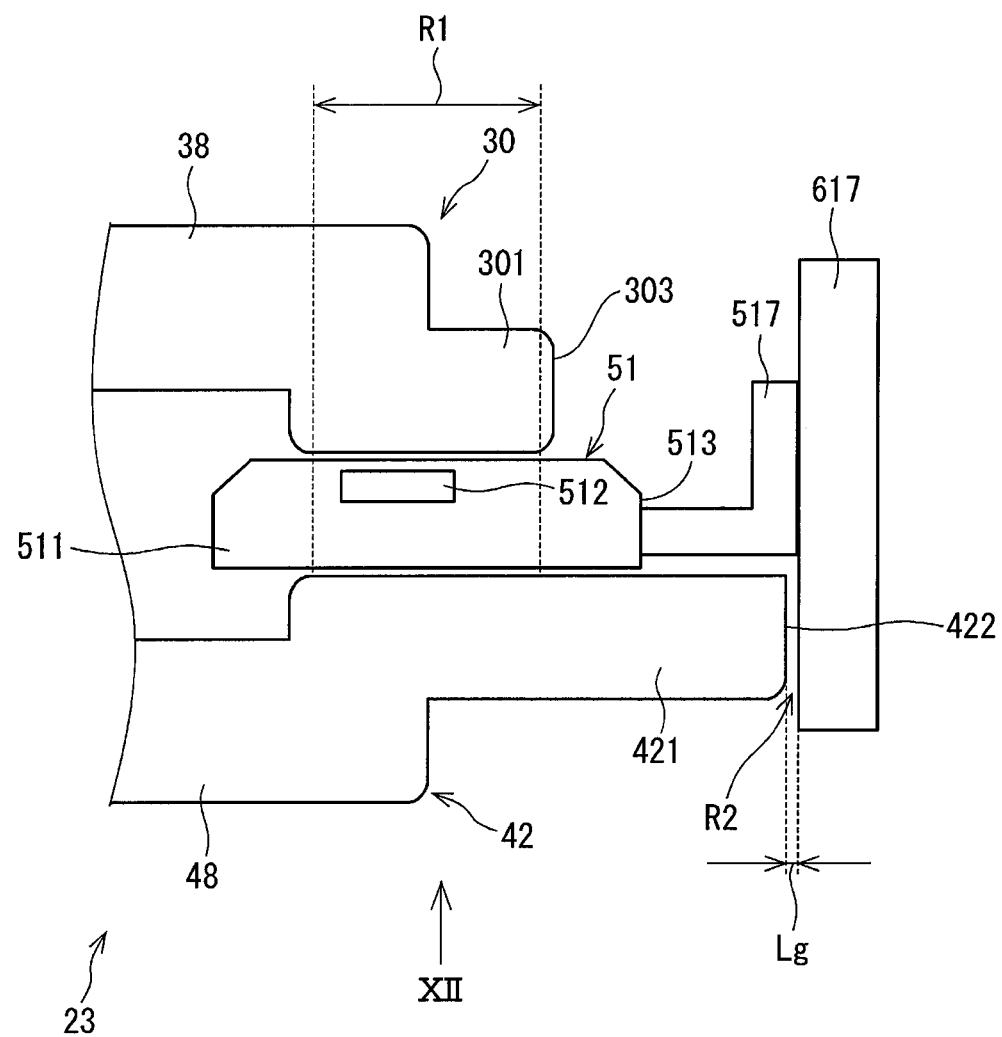
FIG. 11 is a cross-sectional view of each of the sensor portions and the magnetism collection portions according to a third embodiment of the present disclosure.
Figure 12:
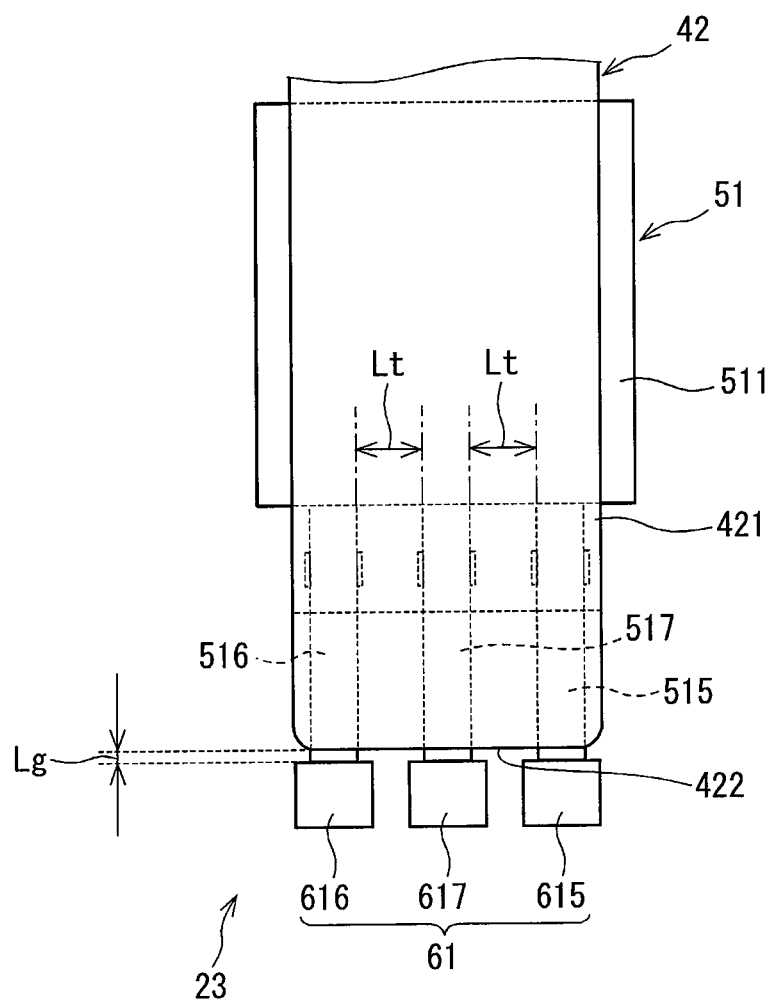
FIG. 12 is a view taken in the direction of the arrow XII in FIG. 11.

FIGS. 11 and 12 show the third embodiment of the present disclosure.

In a lower magnetism collection ring 42 of a detection device 23 in the present embodiment, two lower magnetism collection portions 421 are formed. The lower magnetism collection ring 42 is the same as the lower magnetism collection ring 40 in the foregoing embodiment except that each of the magnetism collection portions 421 has a shape different from that of each of the lower magnetism collection portions of the lower magnetism collection ring 40.

Each of the lower magnetism collection portions 421 is formed to entirely extend to the terminal substrate 61. In other words, as shown in FIG. 12, the lower magnetism collection portion 421 is formed to overlap the output terminal 515, the power supply terminal 516, and the grounded terminal 517 when viewed from below. Between a tip portion 422 of the lower magnetism collection portion 421 and the terminal substrate 61, a minute gap Lg is formed. The minute gap Lg has such a size as to be able to provide insulation between the lower magnetism collection portion 421 and the terminal substrate 61 in normal times and allow electrostatic energy to cause dielectric breakdown of the minute gap Lg when static electricity is applied or allow capacitive coupling through which noise can pass to be formed. The output terminal 515 and the power supply terminal 516 which are disposed at both ends and the grounded terminal 517 disposed in the middle are formed such that an inter-terminal distance Lt between the output terminal 515 or the power supply terminal 516 and the grounded terminal 517 has such a value as to be able to prevent dielectric breakdown caused by static electricity. That is, the minute gap Lg is sufficiently small compared with the inter-terminal distance Lt.

In the present embodiment, each of the sensor portions 51 has the output terminal 515 and the power supply terminal 516 each provided as a non-grounded terminal separately from the grounded terminal 517 and protruding from the sensor main body 511. The lower magnetism collection portion 421 is formed so as to cover at least one portion of each of the output terminal 515, the power supply terminal 516, and the grounded terminal 517 when viewed from the lower magnetism collection portion 421. The lower magnetism collection portion 421 is formed to have the tip portion 422 which is conductive to the terminal substrate 61 including the grounded terminal connection portion 617, the output terminal connection portion 615, and the power supply terminal connection portion 616.

Between the tip portion 422 and the terminal substrate 61, the minute gap Lg is formed.

When static electricity is applied, electrostatic energy causes dielectric breakdown between the terminals 515, 516, and 517 and the lower magnetism collection portion 421. As a result, the electrostatic energy is allowed to appropriately escape toward the column 75 via the lower magnetism collection ring 42. Also, noise is allowed to escape toward the column 75 via the capacitive coupling between the lower magnetism collection portion 121 and the terminal substrate 61. In addition, in the present embodiment, the lower magnetism collection portion 421 covers all the terminals 515 to 517 of the sensor portion 51. Consequently, even when static electricity or noise is applied to any of the terminals, the static electricity or noise is allowed to escape toward the column 75 via the lower magnetism collection ring 42. As a result, even when the noise protection elements 71 are not provided, it is possible to allow the static electricity or noise to appropriately escape without passing through the sensor main body 511.

Additionally, the same effects as achieved in the foregoing embodiment are achieved.

In the present embodiment, the lower magnetism collection ring 42 corresponds to the "conductive member", the lower magnetism collection portion 421 corresponds to the "first magnetism collection portion", the grounded terminal connection portion 617 corresponds to the "grounded wiring portion", and the output terminal connection portion 615 and the power supply terminal connection portion 616 correspond to a "non-grounded wiring portion". Also, the area where the lower magnetism collection portion 421 and the terminal substrate 61 face each other corresponds to the "conductive region".

Fourth Embodiment

Figure 13:
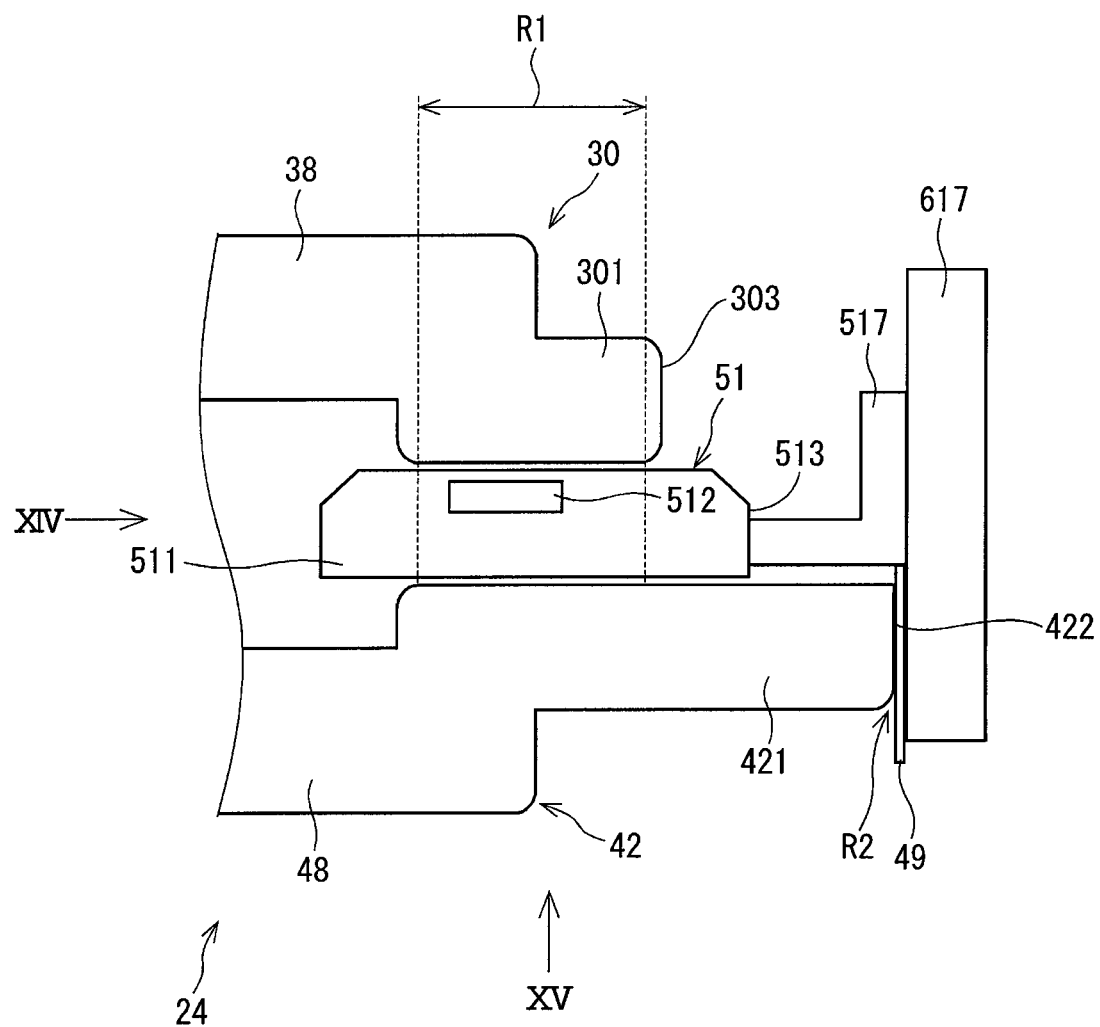
FIG. 13 is a cross-sectional view of each of the sensor portions and the magnetism collection portions according to a fourth embodiment of the present disclosure.
Figure 14:
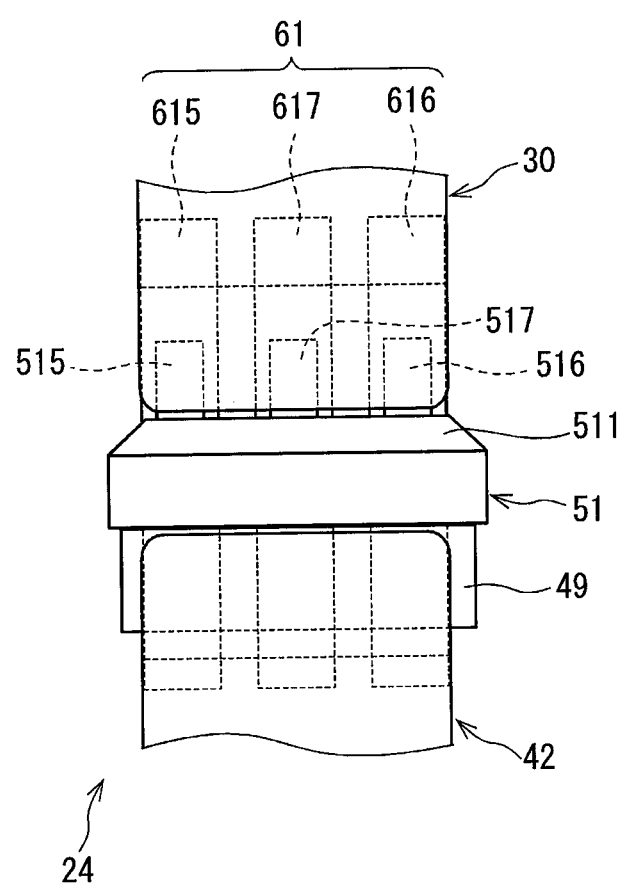
FIG. 14 is a view taken in the direction of the arrow XIV in FIG. 13.
Figure 15:
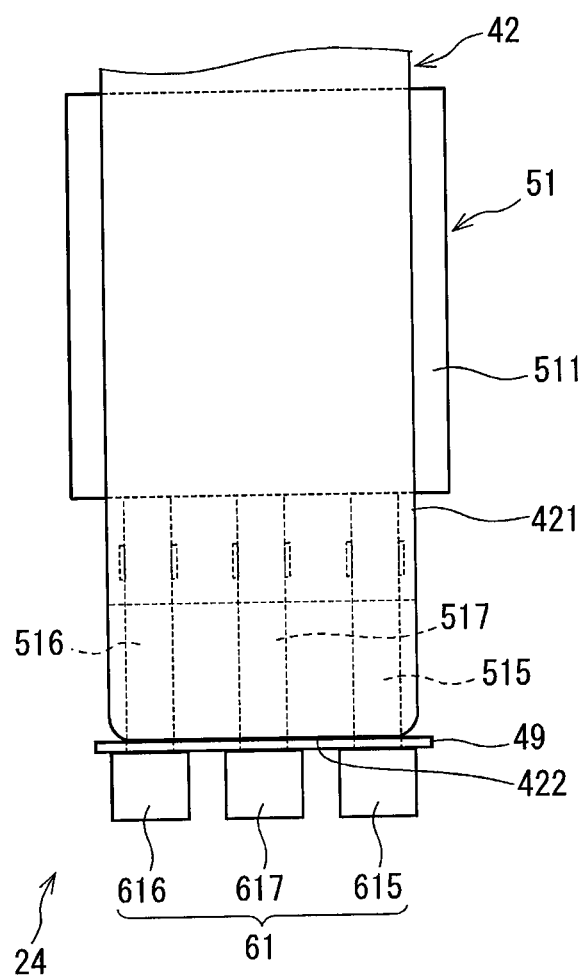
FIG. 15 is a view taken in the direction of the arrow XV in FIG. 13.

FIGS. 13 to 15 show the fourth embodiment of the present disclosure.

The present embodiment is a modification of the third embodiment. In a detection device 24, between the lower magnetism collection portion 421 and the terminal substrate 61, an insulating sheet 49 is provided. The insulating sheet 49 can provide insulation between the lower magnetism collection portion 421 and the terminal substrate 61 in normal times and undergo dielectric breakdown caused by electrostatic energy when static electricity is applied or allow capacitive coupling through which noise can pass to be formed.

By providing the insulating sheet 49, it is possible to appropriately provide the minute gap Lg between the lower magnetism collection portion 421 and the terminal substrate 61.

Additionally, the same effects as achieved in the foregoing embodiment are achieved.

Fifth Embodiment

Figure 16:
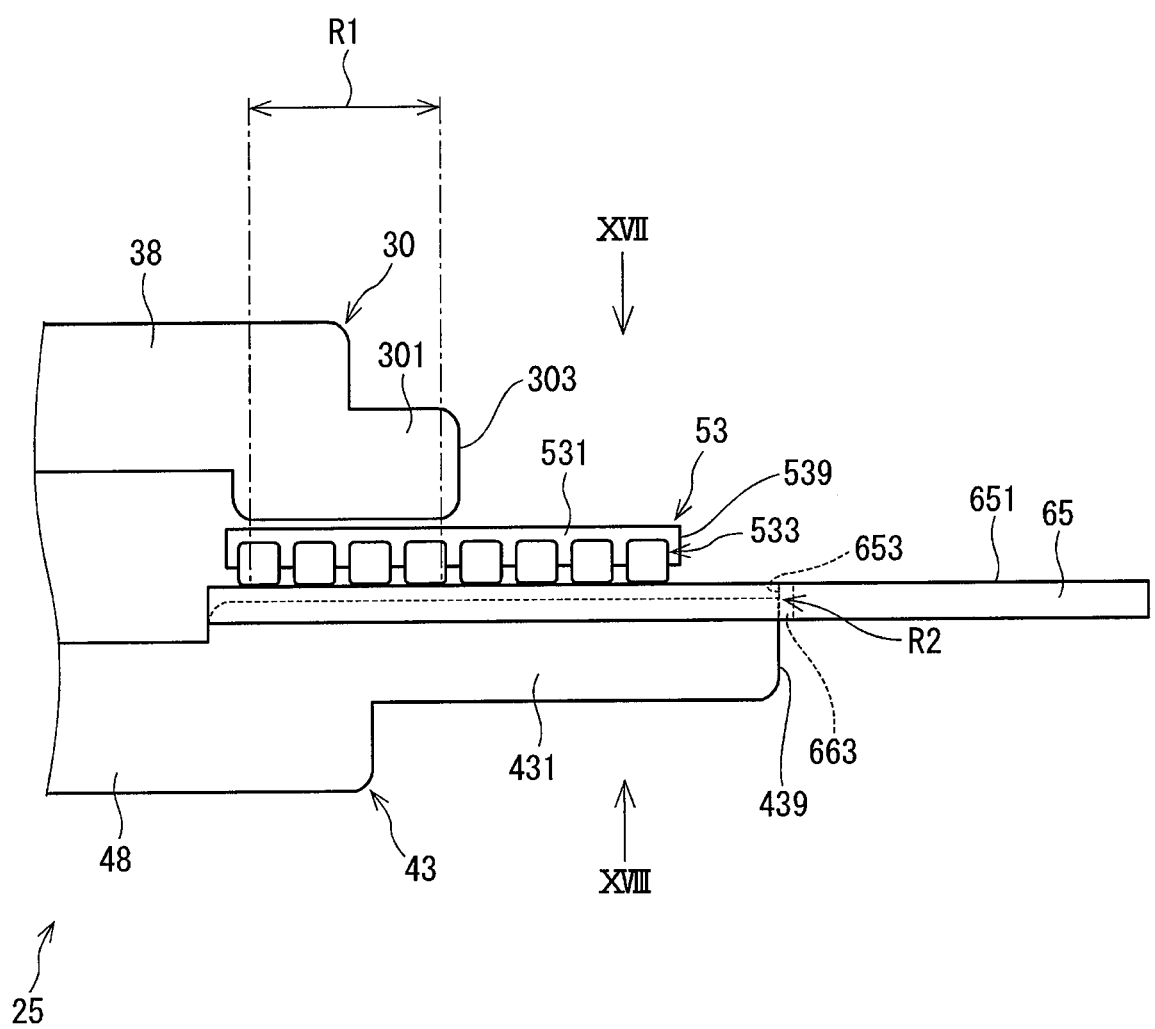
FIG. 16 is a side view of each of the sensor portions and the magnetism collection portions according to a fifth embodiment of the present disclosure.
Figure 17:
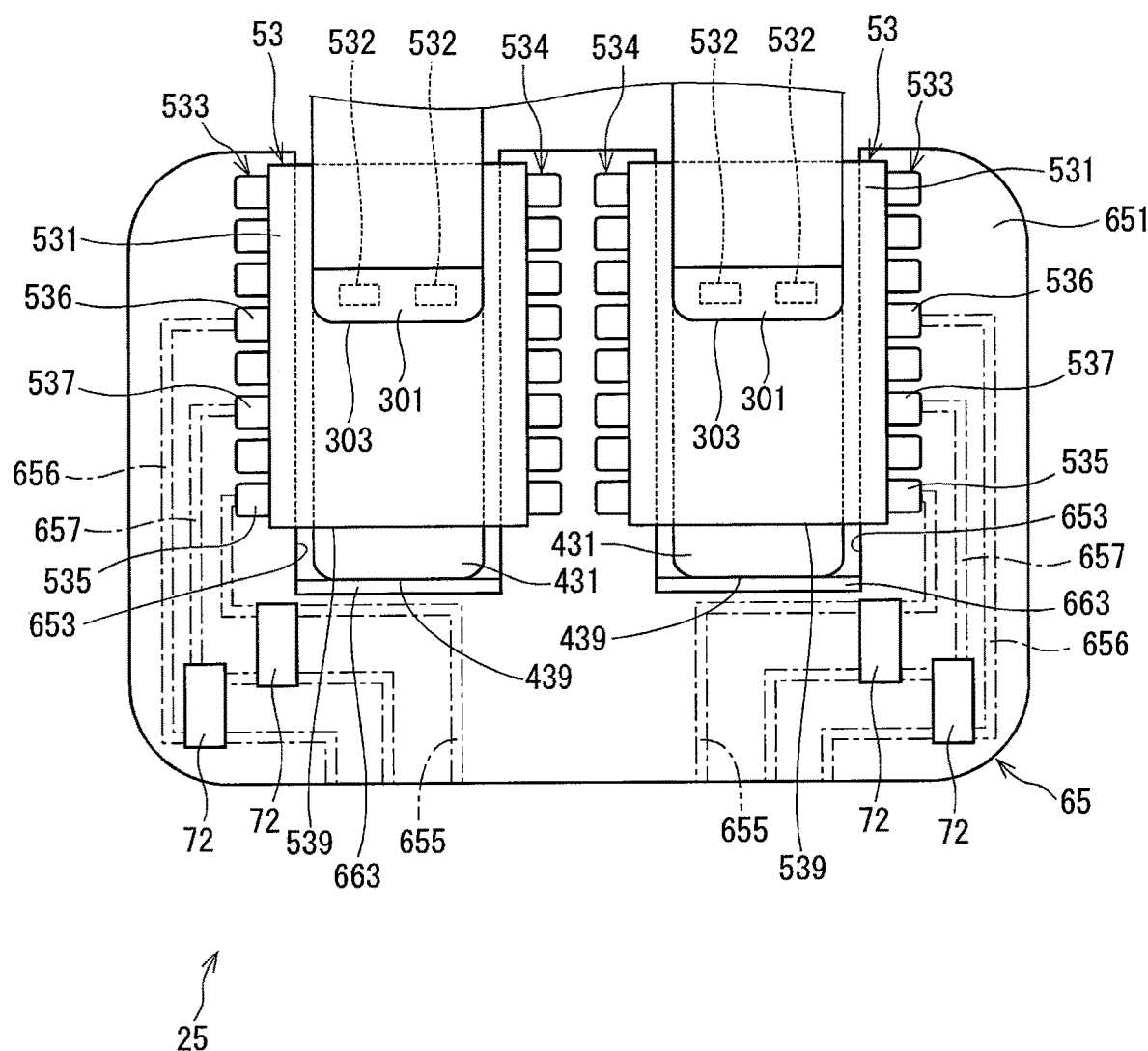
FIG. 17 is a view taken in the direction of the arrow XVII in FIG. 16.
Figure 18:
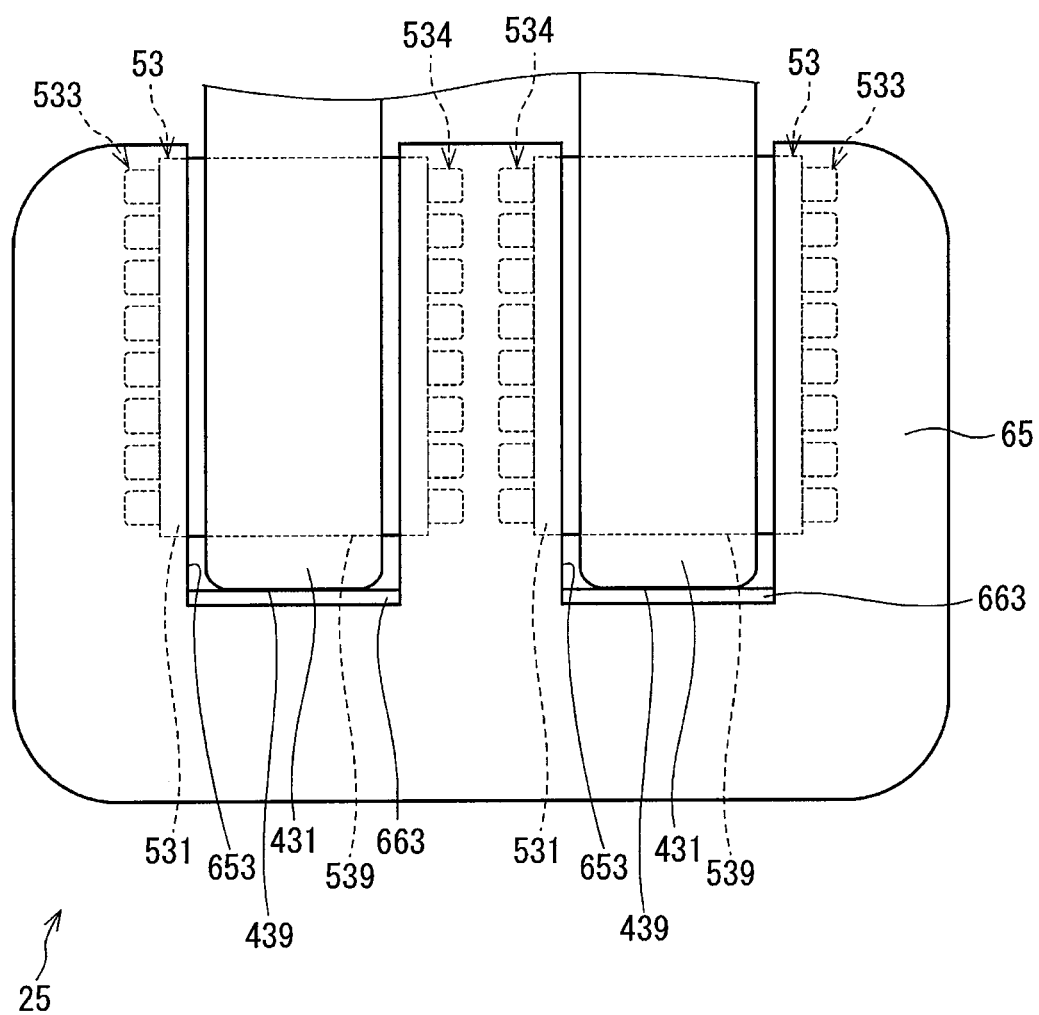
FIG. 18 is a view taken in the direction of the arrow XVIII in FIG. 16.

FIGS. 16 to 18 show the fifth embodiment of the present disclosure. Note that, in FIG. 17 or the like, a circuit pattern in a layer immediately below a surface resist is shown by the dot-dash line.

The present embodiment is different from the foregoing embodiment in that, in a detection device 25 according to the present embodiment, two sensor portions 53 are mounted on the same surface of one substrate 65 as a printed substrate. The sensor portions 53 are disposed between the magnetism collection portions 301 of the upper magnetism collection ring 30 and lower magnetism collection portions 431 of a lower magnetism collection ring 43 to detect a change in magnetic flux between the magnetism collection portions 401 and 431. The lower magnetism collection ring 43 is different in the shape of each of the lower magnetism collection portions 431 from the lower magnetism collection ring 40 in the foregoing embodiment, but is otherwise the same as the lower magnetism collection ring 40 in the foregoing embodiment. The lower magnetism collection portion 431 will be described later.

As shown in FIG. 17, the two sensor portions 53 are mounted side by side on an element mounting surface 651 of the substrate 65. Each of the sensor portions 53 includes a sensor main body 531, sensor elements 532, an outer terminal set 533, and an inner terminal set 534. The sensor main body 531 is formed in a generally rectangular shape in plan view to seal the sensor elements 532.

Each of the sensor elements 532 is a magnetism detection element such as a Hall element, similarly to the sensor element 512 in the foregoing embodiment, and is provided in the region where the magnetism collection portions 301 and 431 overlap each other when viewed from the element mounting surface 651. In the present embodiment, each of the sensor portions 53 has the two sensor elements 532. The sensor elements 532 are disposed in the area where the magnetism collection portions 301 and 431 are closest to each other in the same manner as in the foregoing embodiment. This allows a change in magnetic flux between the upper magnetism collection portion 301 and the lower magnetism collection portion 431 to be appropriately detected.

The outer terminal set 533 is formed along one of the long sides of the sensor main body 531, while the inner terminal set 543 is formed along the other long side of the sensor main body 531.

The outer terminal set 533 includes an output terminal 535, a power supply terminal 536, and a grounded terminal 537. The output terminal 535, the grounded terminal 537, and the power supply terminal 536 are arranged in this order and, between the individual terminals, hollow pins are disposed. In the present embodiment, each of the terminal sets 533 and 534 includes eight terminals, but the number of the terminals may be any number. Also, the arrangement of the terminals may be any arrangement. The same applies also to the embodiments described later.

The output terminal 535 is connected to an output pattern 655 formed in the layer immediately below a resist 659 over the element mounting surface 651 of the substrate 65 and used to output a detection signal from the sensor portion 53. The detection signal is output to the ECU 85.

The power supply terminal 536 is connected to a power supply pattern 656 formed in the layer immediately below the resist 659 over the element mounting surface 651 of the substrate 65 and connected to a power supply portion such as a regulator which is provided in the ECU 85 and not shown.

The grounded terminal 537 is connected to a grounded pattern 657 formed in the layer immediately below the resist 659 over the element mounting surface 651 of the substrate 65 and connected to the ground via the ECU 85.

Noise protection elements 72 are mounted over the element mounting surface 651 of the substrate 65 and connected to the output pattern 655 or the power supply pattern 656 and to the grounded pattern 657. Each of the noise protection elements 72 is a capacitor, a Zener diode, or the like, similarly to each of the noise protection elements 71.

In the substrate 65, two cut-out portions 653 which are opened closer to the base portions 38 and 48 are formed. The cut-out portions 653 are provided to correspond to the respective areas where the sensor portions 53 are mounted and formed such that at least one portion of each of the cut-out portions 653 overlaps the sensor main body 531 when viewed from above the substrate 65. The sensor portions 53 are mounted so as to cover the cut-out portions 653. Into the respective cut-out portions 653, the magnetism collection portions 431 are inserted. By inserting the magnetism collection portions 431 into the cut-out portions 653, the distance between the upper magnetism collection portion 301 and the lower magnetism collection portion 431 is reduced compared to the case where the cut-out portions 653 are not formed and the magnetism collection portion 301 and the magnetism collection portion 431 face each other with the substrate 65 being interposed between the magnetism collection portion 301 and the magnetism collection portion 431, resulting in higher detection accuracy.

The end portion of each of the sensor portions 53 opposite to the base portions 38 and 48 of the magnetism collection rings 30 and 43 is assumed to be a tip portion 539.

In the present embodiment, the tip portion 303 of the upper magnetism collection portion 301 is closer to the base portion 38 than the tip portion 539 of the sensor portion 53.

A tip portion 439 of the lower magnetism collection portion 431 is formed to extend in a direction opposite to that toward the base portion 48 beyond the tip portion 539 of the sensor portion 53 and come in contact with the substrate 65 at the deepest portion of the cut-out portion 653. At the deepest portion of the cut-out portion 653, a grounded pattern 663 is exposed. As a result, the lower magnetism collection ring 43 is electrically connected to the grounded pattern 663.

Thus, in the same manner as in the first embodiment, static electricity and noise are allowed to escape to the column 75 via the grounded pattern 663 and the lower magnetism collection ring 43 without passing through the sensor main body 531.

In the present embodiment, the area where the tip portion 439 of the lower magnetism collection portion 431 and the grounded pattern 663 are in contact with each other corresponds to the "conductive region".

The sensor portions 53 in the present embodiment are surface-mounted on the substrate 65. In the substrate 65, the grounded patterns 657 and 663 as a grounded wiring portion are provided. It is assumed that the grounded patterns 657 and 663 are electrically connected. In the embodiments described later also, the grounded patterns correspond to the "grounded wiring portion".

The upper magnetism collection portions 301 are disposed over the upper surfaces of the mounted sensor portions 53. The lower magnetism collection portions 431 are inserted into the cut-out portions 653 formed in the substrate 65.

By inserting the lower magnetism collection portions 431 into the cut-out portions 653, it is possible to bring the upper magnetism collection portions 301 and the lower magnetism collection portions 431 closer to each other than in the case where the lower magnetism collection portions 431 are not inserted in the cut-out portions 653. This allows the magnetic flux between the upper magnetism collection portions 301 and the lower magnetism collection portions 431 to be more appropriately detected.

Each of the lower magnetism collection portions 431 is inserted into the cut-out portion 653 and provided to be conductive to the grounded pattern 663 in the cut-out portion 653. In the present embodiment, the lower magnetism collection portion 431 comes in conductive contact with the grounded pattern 663 exposed at the deepest portion of the cut-out portion 653.

In such a configuration also, the same effects as achieved in the foregoing embodiment are achieved. In addition, since the lower magnetism collection portion 431 has a simple shape, processing is easier.

In the present embodiment, the lower magnetism collection ring 43 corresponds to the "conductive member", the lower magnetism collection portion 431 corresponds to the "first magnetism collection portion", and the upper magnetism collection ring 30 corresponds to the "facing member".

Sixth Embodiment

Figure 19:
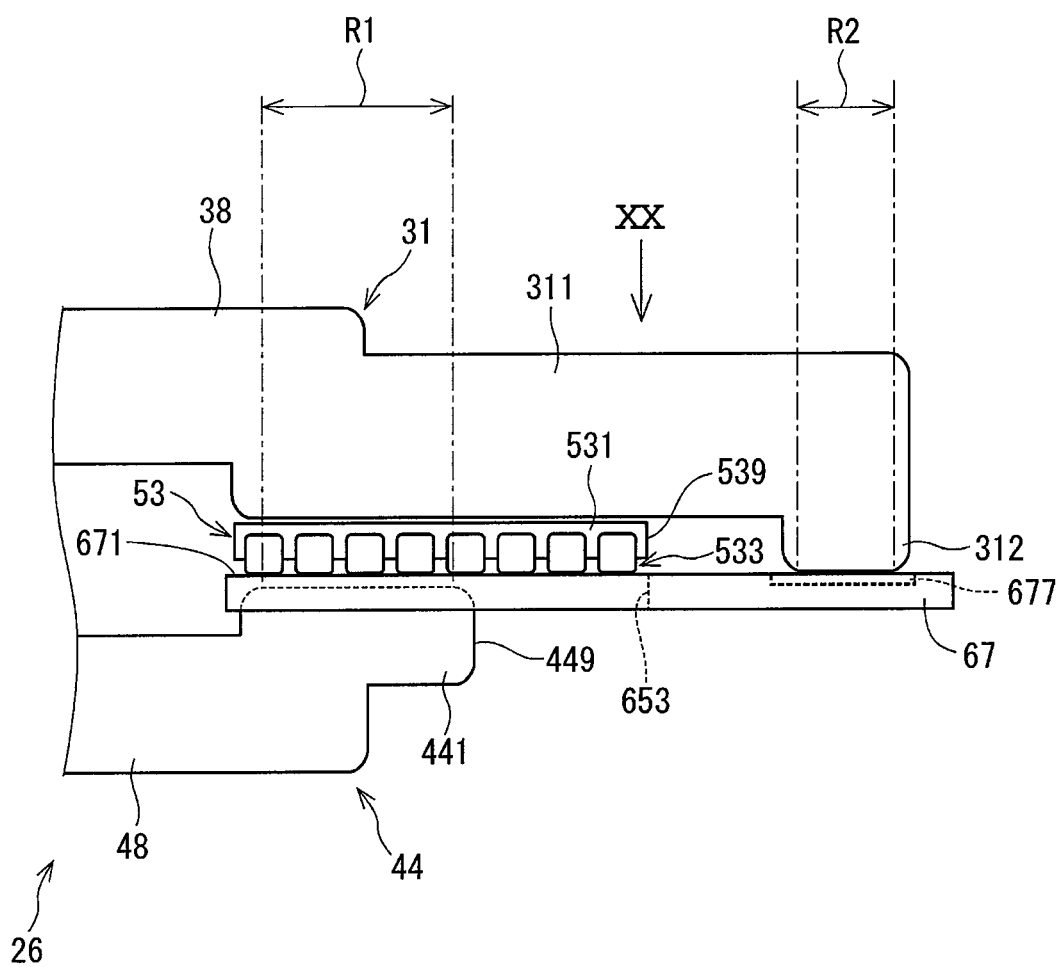
FIG. 19 is a side view of each of the sensor portions and the magnetism collection portions according to a sixth embodiment of the present disclosure.
Figure 20:
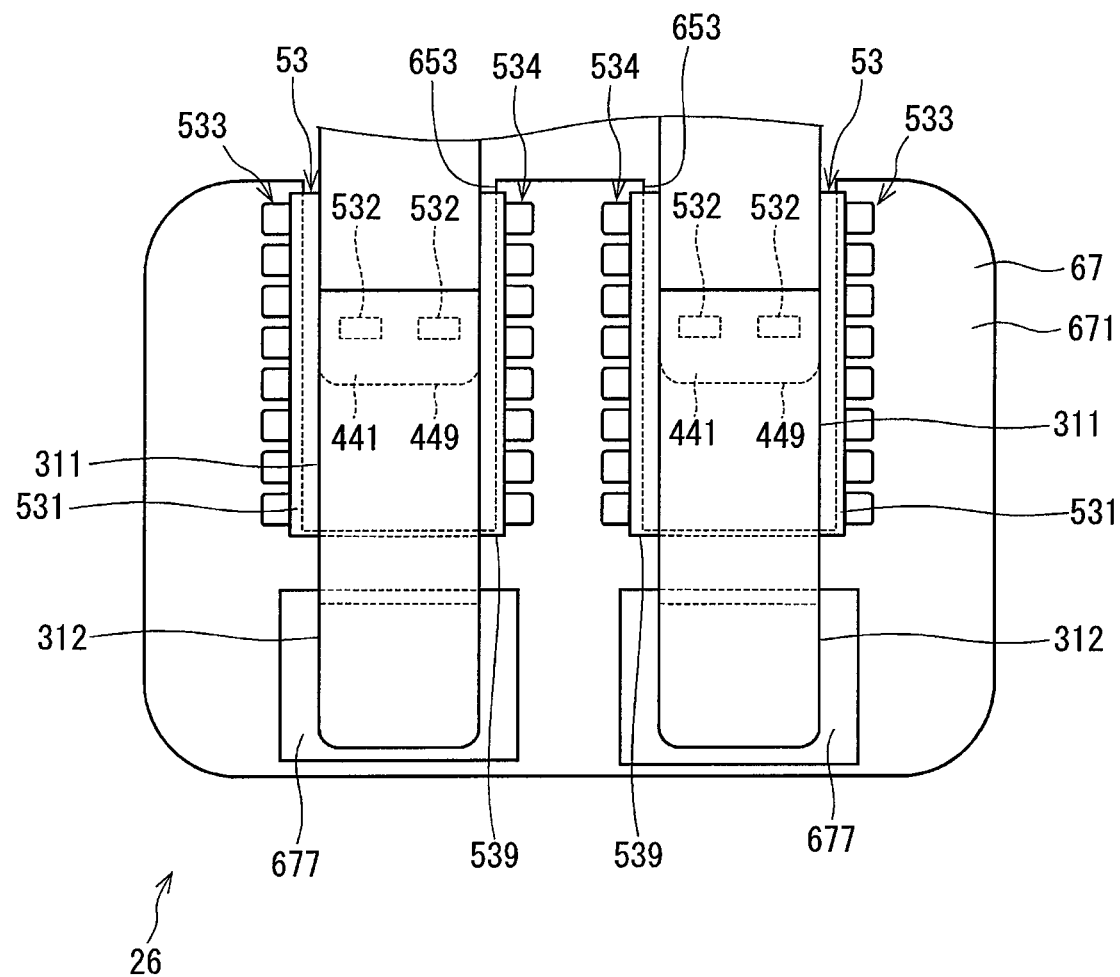
FIG. 20 is a view taken in the direction of the arrow XX in FIG. 19.

FIGS. 19 and 20 show the sixth embodiment of the present disclosure.

In an upper magnetism collection ring 31 of a detection device 26, two upper magnetism collection portions 311 are formed. On the other hand, in a lower magnetism collection ring 44, two lower magnetism collection portions 441 are formed. The functions and the like of the magnetism collection rings 31 and 44 are the same as in the foregoing embodiment except that the magnetism collection portions 311 and 441 have shapes different from those of the magnetism collection portions in the foregoing embodiment. Also, a substrate 67 is the same as the substrate 65 in the foregoing embodiment except for the wiring pattern.

Each of the lower magnetism collection portions 441 has a tip portion 449 closer to the base portion 48 than the tip portion 539 of each of the sensor portions 53.

Each of the upper magnetism collection portions 311 has a tip portion 312 formed to extend in a direction opposite to that toward the base portion 38 beyond the tip end portion 539 of the sensor portion 53, to be bent toward the substrate 67, and to come in contact with an element mounting surface 671 of the substrate 67.

At the portion of the substrate 67 which is in contact with the tip portion 312 of the upper magnetism collection portion 311, a grounded pattern 677 is exposed. As a result, the upper magnetism collection ring 30 is electrically connected to the grounded pattern 677. This allows static electricity and noise to escape toward the column 75 via the grounded pattern 677 and the upper magnetism collection ring 31 without passing through the sensor main body 531.

In the present embodiment, the area where the tip portion 312 of the upper magnetism collection portion 311 and the grounded pattern 677 are in contact with each other corresponds to the "conductive region".

In FIG. 20, the grounded pattern 677 is formed larger in size than the contact region of the tip portion 312. However, the grounded pattern 677 may also be smaller in size than the contact region as long as at least one portion of the grounded pattern 677 is formed to overlap the contact region of the tip portion 312. In addition, the tip portion 312 of each of the upper magnetism collection portions 311 and the substrate 67 may be either in mere contact or connected to be conductive to each other by solder bonding or the like.

Each of the upper magnetism collection portions 311 disposed over the upper surfaces of the mounted sensor portions 53 is formed to extend to the region outside the sensor portion 53 and have the tip portion 312 bent toward the substrate 67 and provided to be conductive to the grounded pattern 677. In the present embodiment, the tip portion 312 come in conductive contact with the grounded pattern 677 exposed at the element mounting surface 671.

In such a configuration also, the same effects as achieved in the foregoing embodiment are achieved. In addition, since it is sufficient to bring the upper magnetism collection portions 311 into contact with the element mounting surface 671 of the substrate 67, assembly is easier.

In the present embodiment, the upper magnetism collection ring 31 corresponds to the "conductive member", the upper base portion 38 corresponds to the "first base portion", and the upper magnetism collection portion 311 corresponds to the "first magnetism collection portion". Also, the lower magnetism collection ring 44 corresponds to the "facing member", the lower base portion 48 corresponds to the "second base portion", and the lower magnetism collection portion 441 corresponds to the "second magnetism collection portion".

Seventh Embodiment

Figure 21:
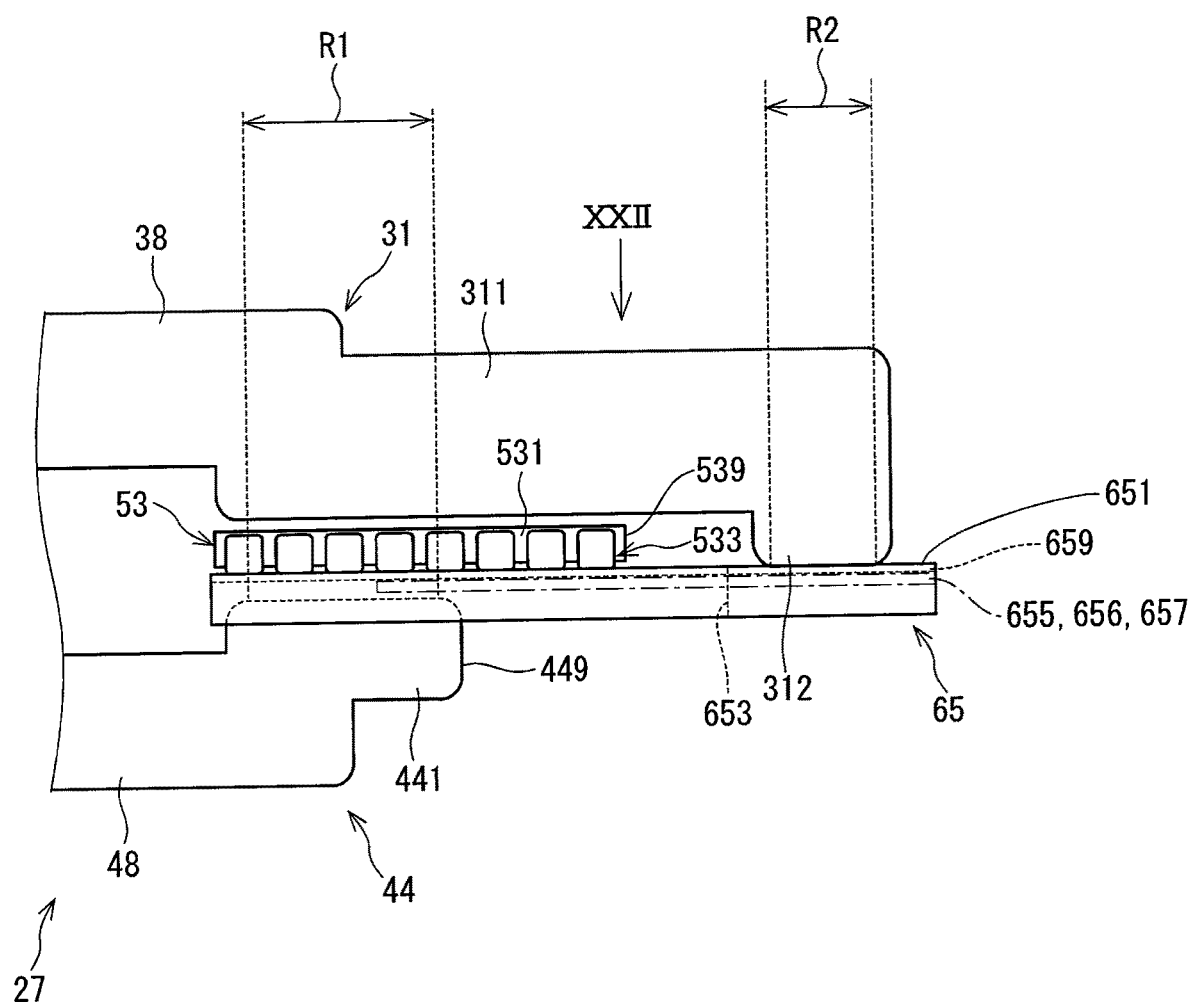
FIG. 21 is a side view of each of the sensor portions and the magnetism collection portions according to a seventh embodiment of the present disclosure.
Figure 22:
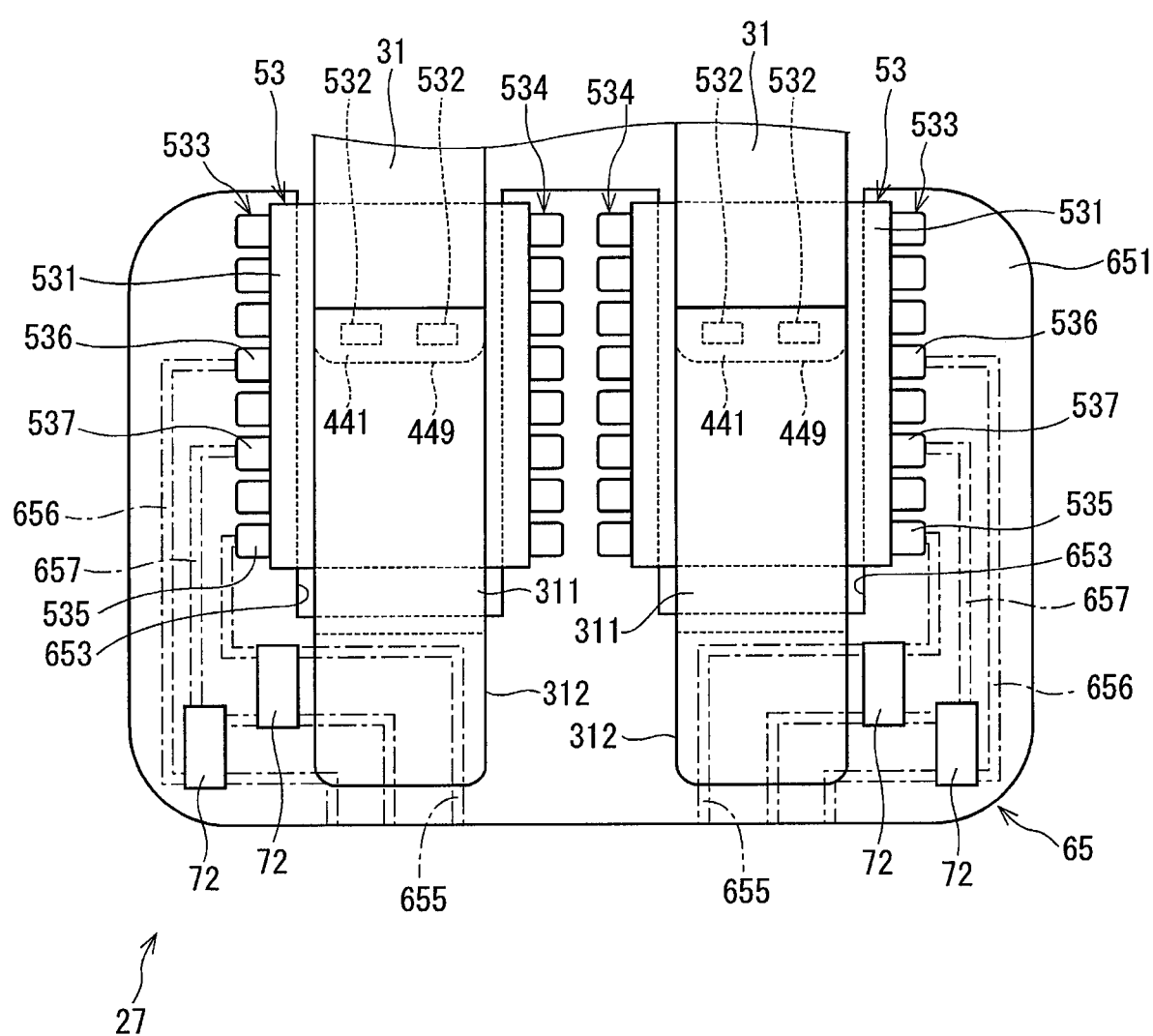
FIG. 22 is a view taken in the direction of the arrow XXII in FIG. 21.

FIGS. 21 and 22 show the seventh embodiment of the present disclosure.

The magnetism collection rings 31 and 44 in a detection device 27 of the present embodiment are the same as in the sixth embodiment, while the substrate 65 is the same as in the fifth embodiment. Note that, at the deepest portion of each of the cut-out portions 653, the grounded pattern 663 (not shown in FIGS. 21 to 24) is not necessarily exposed. The same applies also to the eight embodiment.

In the present embodiment, over the portion of the substrate 65 which is in contact with the tip portion 312 of each of the upper magnetism collection portions 311, the resist 659 is formed. The resist 659 is assumed to be such as to allow static electricity to cause the dielectric breakdown of the resist 659 or allow capacitive coupling through which noise can pass to be formed.

In the layer immediately below the resist 659, in the region in contact with the tip portion 312, the output pattern 655, the power supply pattern 656, and the grounded pattern 657 are formed. As a result, even when static electricity or noise is applied to any of the terminals, electrostatic energy is allowed to escape toward the column 75 via the upper magnetism collection ring 31 in the same manner as in the third embodiment.

The tip portion 312 is provided to be conductive to the grounded pattern 657 formed in the layer immediately below the resist 659 over the element mounting surface 651 as the surface of the substrate 65 where the sensor portions 53 are mounted and with the output pattern 655 and the power supply pattern 656 each as a non-grounded pattern other than the grounded pattern.

As a result, even when the noise protection elements 72 are not provided, it is possible to allow static electricity or noise to appropriately escape toward the column 75 without passing through the sensor main body 531.

In the present embodiment, the output pattern 655 and the power supply pattern 656 correspond to the "non-grounded pattern".

Eighth Embodiment

Figure 23:
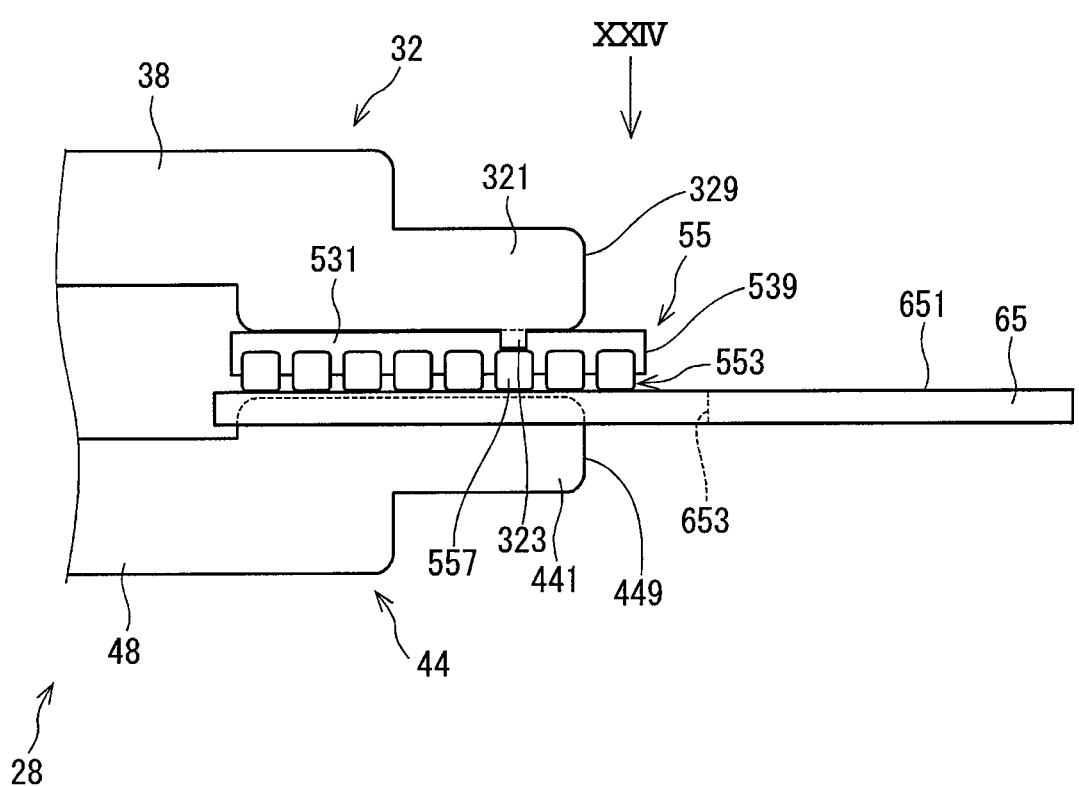
FIG. 23 is a side view of each of the sensor portions and the magnetism collection portions according to an eighth embodiment of the present disclosure.
Figure 24:
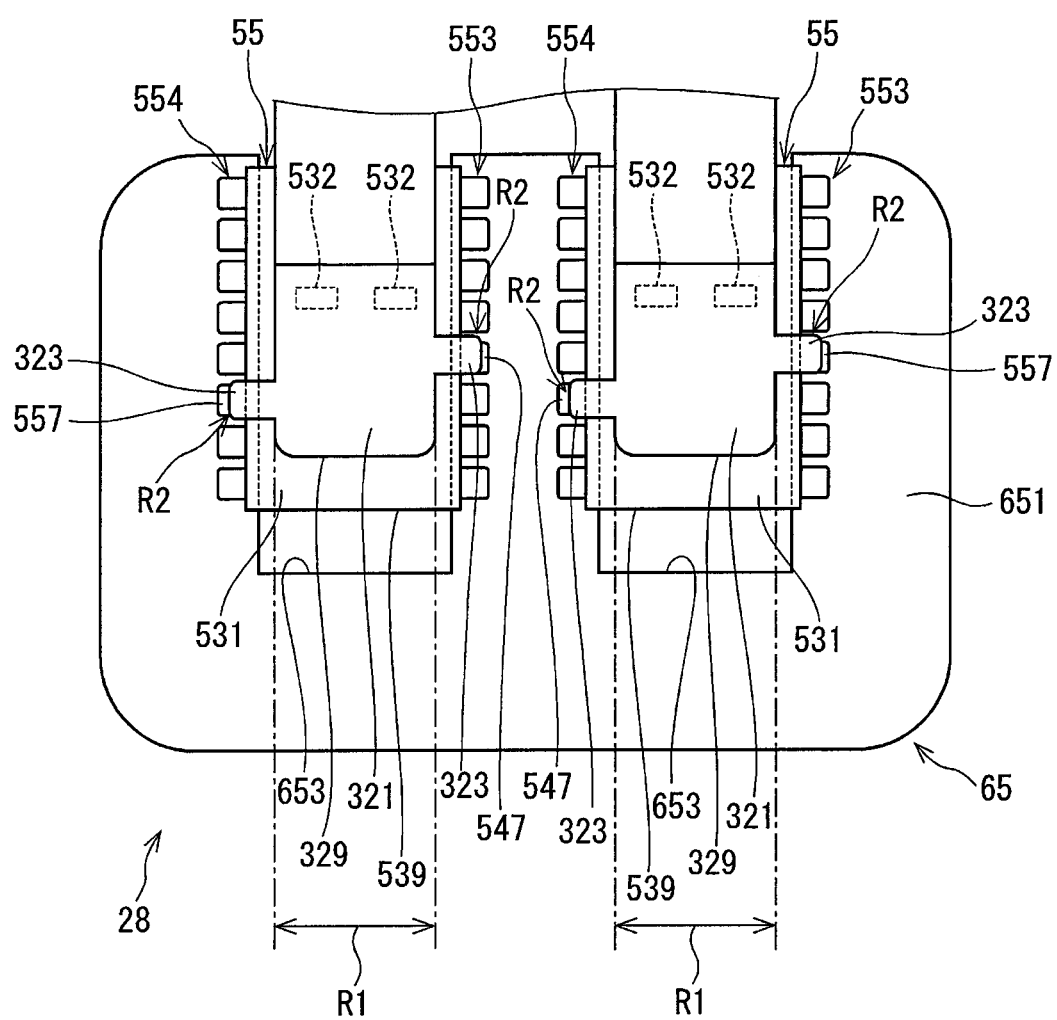
FIG. 24 is a view taken in the direction of the arrow XXIV in FIG. 23.

FIGS. 23 and 24 show the eighth embodiment of the present disclosure. Note that, in FIG. 24, the illustration of the circuit pattern, the noise protection elements, and the like is omitted.

A detection device 28 in the present embodiment differs in the arrangement of terminals in each of sensor portions 55 and the shape of each of upper magnetism collection portions 321 of an upper magnetism collection ring 32.

Each of the sensor portions 55 includes the sensor main body 531, a first terminal set 553, and a second terminal set 554. In the present embodiment, it is assumed that, when viewed from the input shaft 921 (i.e., in front of the surface of the paper sheet with FIG. 24), the first terminal set 553 is on the right side of the sensor main body 531 and the second terminal set 554 is on the left side of the sensor main body 531.

In the present embodiment, each of a tip portion 329 of the upper magnetism collection portion 321 of the upper magnetism collection ring 32 and the tip portion 449 of the lower magnetism collection portion 441 of the lower magnetism collection ring 44 is closer to the base portions 38 and 48 than the tip portion 539 of the sensor main body 531.

In the present embodiment, the fourth terminal in the first terminal set 553 from the tip portion 539 and the third terminal in the second terminal set 554 from the tip portion 539 are grounded terminals 557. The grounded terminals 557 may also be allocated to any of the terminals in the first terminal set 553 and any of the terminals in the second terminal set 554. Alternatively, the grounded terminal 557 in one of the first terminal set 553 and the second terminal set 554 may also be omitted.

It is assumed herein that a direction (left-right direction over the surface of the paper sheet with FIG. 24) perpendicular to the direction in which the upper magnetism collection portion 321 protrudes from the upper base portion 38 is a widthwise direction.

In the upper magnetism collection portions 321, in the areas corresponding to the grounded terminals 557, protruding portions 323 are formed to protrude in the widthwise direction. The protruding portions 323 are bent toward the substrate 65 to come in contact with the grounded terminals 557. The protruding portions 323 and the grounded terminals 557 may be either in mere contact with each other or connected to be conductive to each other by solder bonding or the like.

In the present embodiment, the protruding portions 323 of the upper magnetism collection portions 321 disposed over the upper surfaces of the mounted sensor portions 55 are provided to be conductive to the grounded terminals 557.

As a result, in the same manner as in the foregoing embodiment, static electricity and noise are transmitted from each of the grounded terminals 557 to the upper magnetism collection ring 32 without passing through the sensor main body 531 and allowed to escape toward the column 75. In addition, since each of the protruding portions 323 can be formed relatively small in size, it is possible to reduce the used amount of the material which is needed to form the upper magnetism collection ring 32.

Additionally, the same effects as achieved in the foregoing embodiment are achieved.

In the present embodiment, the upper magnetism collection ring 32 corresponds to the "conductive member", the upper base portion 38 corresponds to the "first base portion", and the upper magnetism collection portion 321 corresponds to the "first magnetism collection portion".

Other Embodiments (a) Magnetism Collection Ring

In each of the first to fourth embodiments, the configuration is such that static electricity or noise is allowed to escape toward the column via the lower magnetism collection ring. In another embodiment, the configuration may also be such that the upper magnetism collection ring and the lower magnetism collection ring are switched to each other and static electricity or noise is allowed to escape toward the column via the upper magnetism collection ring. In other words, a configuration for allowing static electricity or noise to escape may also be provided in the upper magnetism collection ring. In this case, the upper magnetism collection ring corresponds to the "conductive member", and the lower magnetism collection ring corresponds to the "facing member".

In the fifth embodiment, the lower magnetism collection portion and the grounded pattern are provided to be conductive to each other at the deepest portion of each of the cut-out portions. In another embodiment, it may also be possible that the lower magnetism collection portion and the grounded pattern are conductive to each other at the side surface of the cut-out portion.

In each of the sixth embodiment and the seventh embodiment, the tip portion of each of the upper magnetism collection portions is formed to extend in the direction opposite to that toward the base portions of the sensor portion. In another embodiment, the tip portion of the upper magnetism collection portion may also be conductive to the grounded pattern in any of the regions of the substrate which are located outside the sensor portion such as, e.g., the region adjacent to the terminal formation portion.

In the eighth embodiment, the protruding portions are formed on both sides of each of the sensor portions. In another embodiment, it is sufficient for the protruding portion to be formed correspondingly to one grounded terminal for each of the sensor portions.

(b) Sensor Portion

In the first embodiment or the like, the grounded terminal is disposed to be located between the output terminal and the power supply terminal. In another embodiment, the grounded terminal may also be provided in an area other than between the output terminal and the power supply terminal, and the arrangement of the terminals may be any arrangement.

In each of the foregoing embodiments, the sensor element is intended to detect magnetic flux between the magnetism collection portions. In another embodiment, the sensor element may also detect an electromagnetic signal other than magnetic flux. In each of the foregoing embodiments, the number of the sensor elements provided in one sensor portion is 1 or 2. In another embodiment, three or more sensor elements may also be provided in one sensor portion.

In each of the foregoing embodiments, the two pairs of the magnetism collection portions and the sensor portions are provided. In another embodiment, the number of the pairs of the magnetism collection portions and the sensor portions is not limited to 2, but may also be 1 or 3 or more. When there are the plurality of the pairs of the magnetism collection portions and the sensor portions, a configuration for allowing static electricity or noise to escape may also be different from one combination of the magnetism collection portion and the sensor portion to another.

Also, in each of the foregoing embodiments, in the area where "conductive contact" is provided, a minute gap of a size which can transmit static electricity or noise through dielectric breakdown, capacitive coupling, or the like may also be formed. Alternatively, another member such as, e.g., an insulating sheet or a resist pattern may also be provided in the minute gap as long as static electricity or noise can be transmitted.

(c) Substrate

In each of the fifth to eighth embodiments, the sensor portions are mounted on the substrate, and the lower magnetism collection portions are inserted into the cut-out portions formed in the substrate. The cut-out portions are opened closer to the base portions of the magnetism collection rings. In another embodiment, the cut-out portions need not necessarily be opened closer to the base portions. In other words, each of the cut-out portions may also be a hole portion conforming to the shape of the sensor portion, and the lower magnetism collection portion may also be inserted into the hole portion from the side opposite to the substrate mounting surface. Alternatively, the cut-out portions need not necessarily be formed in the substrate.

(d) Grounded Member

In each of the foregoing embodiments, the grounded member is the column. In another embodiment, the grounded member to which static electricity or noise is allowed to escape is not limited to the column and may also be any member such as, e.g., a housing for the detection device.

(e) Detection Device

The detection device in each of the foregoing embodiments is applied to the torque sensor. In another embodiment, the detection device may also be applied to a device other than the torque sensor. In each of the foregoing embodiments, the torque sensor is applied to the electric power steering device. In another embodiment, the torque sensor may also be applied to a device other than the electric power steering device.

The present disclosure described heretofore is by no means limited to the foregoing embodiments and can be implemented in various forms within the scope not departing from the gist of the present disclosure.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

The invention claimed is:

1. A detection device, comprising:
a conductive member provided to be conductive to a grounded member having a ground potential;
a facing member having at least one portion facing the conductive member; and
a sensor portion including a sensor element, a sensor main body and a grounded terminal, the sensor element being disposed in a sensor placement region which is located between the conductive member and the facing member and in which a distance between the conductive member and the facing member is shortest, the sensor main body sealing the sensor element, and the grounded terminal protruding from the sensor main body and connected to a ground,
wherein the conductive member is provided to be conductive to the grounded terminal or a grounded wiring portion connected to the grounded terminal in a conductive region different from the sensor placement region,
wherein the conductive member has a first base portion and a first magnetism collection portion protruding from the first base portion,
wherein the facing member has a second base portion and a second magnetism collection portion protruding from the second base portion and facing the first magnetism collection portion,
wherein the sensor placement region is a region where the first magnetism collection portion and the second magnetism collection portion face each other,
wherein the sensor element detects magnetic flux between the first magnetism collection portion and the second magnetism collection portion, and
wherein the first magnetism collection portion has an escape portion protruding in a direction opposite to that toward the first base portion.

2. The detection device according to claim 1,
wherein a case where the conductive member is provided to be conductive to the grounded terminal or the grounded wiring portion includes a case where the conductive member is in contact with the grounded terminal or the grounded wiring portion, a case where the conductive member is electrically connected to the grounded terminal or the grounded wiring portion, and a case where a minute gap is formed between the conductive member and the grounded terminal or the grounded wiring portion.

3. The detection device according to claim 1,
wherein a case where the conductive member is provided to be conductive to the grounded member includes a case where the conductive member is in contact with the grounded member, a case where the conductive member is electrically connected to the grounded member, and a case where a minute gap is formed between the conductive member and the grounded member.

4. The detection device according to claim 1,
wherein the escape portion has a tip bent toward the grounded terminal and is provided to be conductive to the grounded terminal.

5. The detection device according to claim 1,
wherein the escape portion extends in the direction opposite to that toward the first base portion and is provided to be conductive to the grounded wiring portion at a tip portion of the escape portion.

6. The detection device according to claim 1,
wherein the grounded wiring portion has a grounded pattern provided in a substrate,
wherein the sensor portion is surface-mounted on the substrate,
wherein one of the first magnetism collection portion and the second magnetism collection portion is disposed over an upper surface of the sensor portion, and
wherein the other of the first magnetism collection portion and the second magnetism collection portion is inserted in a cut-out portion formed in the substrate.

7. The detection device according to claim 1,
wherein the grounded wiring portion is included in a terminal substrate,
wherein the sensor portion further includes a non-grounded terminal protruding from the sensor main body and provided separately from the grounded terminal,
wherein the non-grounded terminal is connected to a non-grounded wiring portion of the terminal substrate,
wherein the first magnetism collection portion covers at least one portion of each of the grounded terminal and the non-grounded terminal when viewed from the first magnetism collection portion, and wherein the first magnetism collection portion has a minute gap between a tip portion of the first magnetism collection portion and the terminal substrate.

8. The detection device according to claim 7, wherein the minute gap has a width such as to allow electrostatic energy to cause dielectric breakdown of the minute gap when static electricity is applied or form capacitive coupling allowing noise to pass through the minute gap.

9. The detection device according to claim 1, wherein the sensor portion is surface-mounted on an element mounting surface of a substrate, wherein the first magnetism collection portion is disposed over an upper surface of the sensor portion and extends to a region outside the sensor portion, wherein the second magnetism collection portion is inserted in a cut-out portion formed in the substrate, wherein the first magnetism collection portion has a tip portion bent toward the substrate and in contact with the element mounting surface, wherein, the substrate has, below the element mounting surface, a grounded pattern connected to the grounded terminal and a non-grounded pattern other than the grounded pattern, and wherein a resist is provided between the tip portion and each of the grounded pattern and the non-grounded pattern.

10. The detection device according to claim 9, wherein the resist undergoes dielectric breakdown caused by electrostatic energy when static electricity is applied or forms capacitive coupling allowing noise to pass through the resist.

11. A torque sensor comprising the detection device according to claim 1, wherein the sensor element detects magnetic flux in accordance with a torque applied between a first shaft and a second shaft.

12. A detection device, comprising:
a conductive member provided to be conductive to a grounded member having a ground potential;
a facing member having at least one portion facing the conductive member; and
a sensor portion including a sensor element, a sensor main body and a grounded terminal, the sensor element being disposed in a sensor placement region which is located between the conductive member and the facing member and in which a distance between the conductive member and the facing member is shortest, the sensor main body sealing the sensor element, and the grounded terminal protruding from the sensor main body and connected to a ground,
wherein the conductive member is provided to be conductive to the grounded terminal or a grounded wiring portion connected to the grounded terminal in a conductive region different from the sensor placement region,
wherein the conductive member has a first base portion and a first magnetism collection portion protruding from the first base portion,
wherein the facing member has a second base portion and a second magnetism collection portion protruding from the second base portion and facing the first magnetism collection portion,
wherein the sensor placement region is a region where the first magnetism collection portion and the second magnetism collection portion face each other,
wherein the sensor element detects magnetic flux between the first magnetism collection portion and the second magnetism collection portion,
wherein the grounded wiring portion has a grounded pattern provided in a substrate,
wherein the sensor portion is surface-mounted on the substrate,
wherein one of the first magnetism collection portion and the second magnetism collection portion is disposed over an upper surface of the sensor portion,
wherein the other of the first magnetism collection portion and the second magnetism collection portion is inserted in a cut-out portion formed in the substrate, and
wherein the first magnetism collection portion is inserted in the cut-out portion and provided to be conductive to the grounded pattern in the cut-out portion.

13. A detection device, comprising:
a conductive member provided to be conductive to a grounded member having a ground potential;
a facing member having at least one portion facing the conductive member; and
a sensor portion including a sensor element, a sensor main body and a grounded terminal, the sensor element being disposed in a sensor placement region which is located between the conductive member and the facing member and in which a distance between the conductive member and the facing member is shortest, the sensor main body sealing the sensor element, and the grounded terminal protruding from the sensor main body and connected to a ground,
wherein the conductive member is provided to be conductive to the grounded terminal or a grounded wiring portion connected to the grounded terminal in a conductive region different from the sensor placement region,
wherein the conductive member has a first base portion and a first magnetism collection portion protruding from the first base portion,
wherein the facing member has a second base portion and a second magnetism collection portion protruding from the second base portion and facing the first magnetism collection portion,
wherein the sensor placement region is a region where the first magnetism collection portion and the second magnetism collection portion face each other,
wherein the sensor element detects magnetic flux between the first magnetism collection portion and the second magnetism collection portion,
wherein the grounded wiring portion has a grounded pattern provided in a substrate,
wherein the sensor portion is surface-mounted on the substrate,
wherein one of the first magnetism collection portion and the second magnetism collection portion is disposed over an upper surface of the sensor portion,
wherein the other of the first magnetism collection portion and the second magnetism collection portion is inserted in a cut-out portion formed in the substrate,
wherein the first magnetism collection portion is disposed over the upper surface of the sensor portion and extends to a region outside the sensor portion, and
wherein the first magnetism collection portion has a tip portion bent toward the substrate and provided to be conductive to the grounded pattern.

14. A detection device, comprising:
a conductive member provided to be conductive to a grounded member having a ground potential;

a facing member having at least one portion facing the conductive member; and a sensor portion including a sensor element, a sensor main body and a grounded terminal, the sensor element being disposed in a sensor placement region which is located between the conductive member and the facing member and in which a distance between the conductive member and the facing member is shortest, the sensor main body sealing the sensor element, and the grounded terminal protruding from the sensor main body and connected to a ground, wherein the conductive member is provided to be conductive to the grounded terminal or a grounded wiring portion connected to the grounded terminal in a conductive region different from the sensor placement region, wherein the conductive member has a first base portion and a first magnetism collection portion protruding from the first base portion, wherein the facing member has a second base portion and a second magnetism collection portion protruding from the second base portion and facing the first magnetism collection portion, wherein the sensor placement region is a region where the first magnetism collection portion and the second magnetism collection portion face each other, wherein the sensor element detects magnetic flux between the first magnetism collection portion and the second magnetism collection portion, wherein the grounded wiring portion has a grounded pattern provided in a substrate, wherein the sensor portion is surface-mounted on the substrate, wherein one of the first magnetism collection portion and the second magnetism collection portion is disposed over an upper surface of the sensor portion, wherein the other of the first magnetism collection portion and the second magnetism collection portion is inserted in a cut-out portion formed in the substrate, wherein the first magnetism collection portion is disposed over the upper surface of the sensor portion, and wherein the first magnetism collection portion has a protruding portion provided to be conductive to the grounded terminal.

15. A detection device, comprising:

a conductive member provided to be conductive to a grounded member having a ground potential;

a facing member having at least one portion facing the conductive member; and a sensor portion including a sensor element, a sensor main body and a grounded terminal, the sensor element being disposed in a sensor placement region which is located between the conductive member and the facing member and in which a distance between the conductive member and the facing member is shortest, the sensor main body sealing the sensor element, and the grounded terminal protruding from the sensor main body and connected to a ground, wherein the conductive member is provided to be conductive to the grounded terminal or a grounded wiring portion connected to the grounded terminal in a conductive region different from the sensor placement region, wherein the conductive member has a first base portion and a first magnetism collection portion protruding from the first base portion, wherein the facing member has a second base portion and a second magnetism collection portion protruding from the second base portion and facing the first magnetism collection portion, wherein the sensor placement region is a region where the first magnetism collection portion and the second magnetism collection portion face each other, wherein the sensor element detects magnetic flux between the first magnetism collection portion and the second magnetism collection portion, wherein the grounded wiring portion is included in a terminal substrate, wherein the sensor portion further includes a non-grounded terminal protruding from the sensor main body and provided separately from the grounded terminal, wherein the non-grounded terminal is connected to a non-grounded wiring portion of the terminal substrate, wherein the first magnetism collection portion covers at least one portion of each of the grounded terminal and the non-grounded terminal when viewed from the first magnetism collection portion, wherein the first magnetism collection portion has a minute gap between a tip portion of the first magnetism collection portion and the terminal substrate, wherein an insulating sheet is provided in the minute gap, and wherein the insulating sheet undergoes dielectric breakdown caused by electrostatic energy when static electricity is applied or forms capacitive coupling allowing noise to pass through the insulating sheet.

* * * * *